United States Patent
Togawa et al.

(10) Patent No.: US 7,252,198 B2
(45) Date of Patent: Aug. 7, 2007

(54) MAIL SYSTEM, MAIL ADDRESS MANAGING APPARATUS, MAIL TRANSMITTING METHOD, AND COMPUTER-READABLE RECORDING MEDIUM IN WHICH MAIL SYSTEM PROGRAM IS RECORDED

(75) Inventors: Yoshifusa Togawa, Kawasaki (JP); Takahiro Masuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 673 days.

(21) Appl. No.: 09/818,547

(22) Filed: Mar. 28, 2001

(65) Prior Publication Data

US 2002/0004821 A1 Jan. 10, 2002

(30) Foreign Application Priority Data

Jul. 6, 2000 (JP) ............................. 2000-205189

(51) Int. Cl.
*G06F 15/16* (2006.01)
(52) U.S. Cl. ...................................... 209/206; 709/206
(58) Field of Classification Search ................ 709/206, 709/245
See application file for complete search history.

(56) References Cited

U.S. PATENT DOCUMENTS

| | | | |
|---|---|---|---|
| 5,283,887 A | | 2/1994 | Zachery |
| 5,765,170 A | * | 6/1998 | Morikawa .................... 707/200 |
| 5,826,039 A | | 10/1998 | Jones |
| 5,844,969 A | * | 12/1998 | Goldman et al. ......... 379/93.24 |
| 5,974,448 A | * | 10/1999 | Yamauchi et al. ........... 709/206 |
| 6,055,240 A | | 4/2000 | Tunnicliffe |
| 6,427,164 B1 | * | 7/2002 | Reilly .......................... 709/206 |
| 6,463,462 B1 | * | 10/2002 | Smith et al. ................. 709/206 |
| 6,532,489 B1 | * | 3/2003 | Merchant ..................... 709/206 |
| 6,892,222 B2 | | 5/2005 | McDowell et al. .......... 709/206 |

(Continued)

FOREIGN PATENT DOCUMENTS

EP 0 924 921 A1 6/1999

(Continued)

OTHER PUBLICATIONS

T. Matsuo "Message Server Equipment Using Directory Management," Japanese Patent Laid-Open (Kokai) HEI 11-065960 Laid Open Date: Mar. 9, 1999.

(Continued)

*Primary Examiner*—Krisna Lim
(74) *Attorney, Agent, or Firm*—Staas & Halsey LLP

(57) ABSTRACT

A mail system equipped with a mail address manager for managing a mail address or addresses of one or more destinations. When a mail address of a particular destination is updated, the mail address manager registers the old mail address of the particular destination and a new mail address in correlation with each other. The result is that, even when the mail address of an intended destination has been updated, a mail source can proceed to send an e-mail, which is addressed to the intended destination at the old mail address, exactly to the intended destination without checking whether the mail address of the intended destination has been updated. Also at the mail source, it is possible to send an e-mail exactly to an intended destination without checking a restriction on a system environment of the intended destination.

25 Claims, 25 Drawing Sheets

U.S. PATENT DOCUMENTS

| | | | |
|---|---|---|---|
| 6,895,427 B2* | 5/2005 | Quine et al. | 709/206 |
| 6,981,023 B1* | 12/2005 | Hamilton et al. | 709/206 |
| 2001/0049745 A1* | 12/2001 | Schoeffler | 709/238 |
| 2002/0087647 A1* | 7/2002 | Quine et al. | 709/206 |
| 2002/0103932 A1* | 8/2002 | Bilbrey et al. | 709/245 |
| 2006/0031364 A1* | 2/2006 | Hamilton et al. | 709/206 |

FOREIGN PATENT DOCUMENTS

| | | |
|---|---|---|
| JP | 3-4640 | 1/1991 |
| JP | 5-122245 | 5/1993 |
| JP | 6-62050 | 3/1994 |
| JP | 6-139164 | 5/1994 |
| JP | 6-276221 | 9/1994 |
| JP | 6-290122 | 10/1994 |
| JP | 11-8617 | 1/1999 |
| JP | 11-65960 | 3/1999 |
| JP | 11-74931 | 3/1999 |
| JP | 11-163924 | 6/1999 |
| JP | 11-167533 | 6/1999 |
| JP | 11-184787 | 7/1999 |
| JP | 11-306099 | 11/1999 |
| WO | WO 97/39532 | 10/1997 |
| WO | WO 99/30464 | 6/1999 |

OTHER PUBLICATIONS

R. Kasai, et al. "Method and System for Managing Message and Storage Medium Storing Message Managing Program," Japanese Patent Laid-Open (Kokai) HEI 11-184787, Laid-Open Date: Jul. 9, 1990.

K. Uchiumi, "Change/Registration/Notification System For Electronic Mail Address," Japanese Patent Laid-Open (Kokai) HEI 11-074931, Laid-Open Date: Mar. 16, 1999.

M. Tomoioka, "Electronic Mail Firewall Device," Japanese Patent Laid-Open (Kokai) HEI 11-167533 Laid-Open Date: Jun. 22, 1999.

S. Shindo, "Automatic Body Transforming System For Electronic Mail by Destinations," Japanese Patent Laid-Open (Kokai) HEI 6-062050, Laid-Open Date: Mar. 4, 1994.

K. Watanabe, et al. "Information Dividing/Displaying Type Electronic Mail System and Electronic Mail Transmitting/Receiving Method," Japanese Patent Laid-Open (Kokai) HEI 6-290122, Laid-Open Date: Oct. 18, 1994.

M. Yasutak "Electronic mail System Containing Top Secret Mail Function," Japanese Patent Laid-Open (Kokai) Laid-Open Date: Sep. 30, 1994.

T. Sato, "Encryption System for Electronic Mail and Encryption Method," Japanese Patent Laid-Open (Kokai) HEI 11-008617, Laid-Open Date: Jan. 12, 1999.

"Mail Address Change Notification", IBM Technical Disclosure Bulletin, vol. 36, No. 1, Jan. 1993, pp. 70-72.

Copy of European Search Report dated Sep. 11, 2003, for corresponding EP Application 01107037.2.

Manfred Bogen, et al., "W3Gate—A Web access for outsiders", Computer Networks and ISDN Systems, vol. 28, No. 14, Nov. 1, 1996, pp. 1979-1990.

J.J. Bos, "Digital signatures and the electronic health records: providing legal and security guarantees", International Journal of Bio-Medical Computing, vol. 42, No. 1, Jul. 1, 1996, pp. 157-163.

Final Notice of Rejection Grounds for the corresponding Japanese Patent Application No. 2001-204612 mailed Jul. 25, 2006.

* cited by examiner

| OLD ADDRESS | NEW ADDRESS |
|---|---|
| xxx@division-A.some-company.co.jp | xxx@division-B.some-company.co.jp |
| aaa@division-A.some-company.co.jp | |

```
Return-Path: <mail-master@some-company.co.jp>
Received: from mail-master
        (mail-master.some-company.co.jp [xxx.xxx.xxx.xxx])
        by mail.some-company.co.jp (Post.Office MTA vx.x.x
        release zzz-zzz-zzz ID# **************) with SMTP id AAAAAA
        for <mail-master@some-company.co.jp>;
        Wed, 24 Dec 1999 19:24:50 +0900
X-Sender: mail-master@some-company.co.jp
X-Mailer: Expanded Mailer V1.2
Date: Wed, 24 Dec 1999 19:23:58 +0900
To: john doe <jdoe@unknown-company.co.jp>
From: mail-master <mail-master@some-company.co.jp>
Subject: information of address change
Mime-Version: 1.0
Content-Type: text/plain; charset="us-ascii"
Message-ID: <some-unique-identifier@mail-master.some-company.co.jp>

An address of the mail you sent was changed.
but the mail was delivered fairly.
YOU DON'T HAVE TO SEND AGAIN.

expired address:
        xxxx@some-company.co.jp
changed to address:
        xxxx@another-company.co.jp please change your address-list.

---
***** contents of mail ***
---

******************************
more information:
        mail to mail-master@some-company.co.jp
thank you.
```

|  | xxx@aa.bbb..co.jp | yyy@cc.bbb.co.jp |  |
|---|---|---|---|
| RECEIVED SIZE RESTRICTION (KB/CASE) | 1024 | 1024 | |
| COMPRESSION TOOL | Lha | Zip | |
| DIVIDE/COMBINE | POSSIBLE | POSSIBLE | |
| CIPHER | POSSIBLE | IMPOSSIBLE | |

40

MAIL SYSTEM, MAIL ADDRESS MANAGING APPARATUS, MAIL TRANSMITTING METHOD, AND COMPUTER-READABLE RECORDING MEDIUM IN WHICH MAIL SYSTEM PROGRAM IS RECORDED

BACKGROUND OF THE INVENTION

1. Field of the Invention

The present invention relates to a method of sending an e-mail from a mail source to the mail address to a destination, a mail system, a mail address managing apparatus, and a computer-readable recording medium storing a mail system program, which are used in the method.

2. Description of Related Art

Mail systems of the type described distribute on the Internet e-mails sent by mail sources to destinations designated by the respective mail addresses of the e-mails.

FIG. 24 of the accompanying drawings is a block diagram showing a conventional mail system. The conventional mail system 1' comprises, as shown in FIG. 24, mail servers 11 (11a, 11b) and clients 10 (10a-1, 10a-2, 10b-1 through 10b-3), which are individually connected to a network 12.

The individual mail server 11 (11a, 11b) manages mail addresses of the individual users. Specifically, the mail server 11 (11a, 11b) manages the individual mail addresses by managing a plurality of mail boxes (not shown) corresponding to the mail addresses of the individual users so that the e-mails sent from the clients 10 are stored separately in these mail boxes.

A mail server is known which sends an e-mail, stored in the user's mail box, to a mailer (mailing program) set in the individual client in response to the user's request.

Conveniently in the following description, it is assumed that a particular mail address is assigned to the individual client 10. And in FIG. 24, the mail system 1' comprises two mail servers 11a, 11b, and five clients 10 (10a-1, 10a-2, 10b-1 through 10b-3) The mail server 11a manages the mail addresses set in the clients 10a-1, 10a-2, while the mail server 11b manages the mail addresses set in the clients 10b-1 through 10b-3.

Mailers are set one in each client 10; at the individual client, the user creates, sends and receives an e-mail using the mailer.

In the following description, reference alphanumeric symbol 11a or 11b is used to designate a single particular one of the plural mail servers, and reference number 11 is used to designate an arbitrary mail server.

Likewise, reference alphanumeric symbol 10a-1, 10a-2, 10b-1 through 10b-3 is used to designate a single particular one of the plural clients, and reference number 10 is used to designate an arbitrary client.

In this conventional mail system 1', when sending an e-mail from the client 10b-1 (mail source) to the client 10a-1 (destination), firstly the mail-source client 10b-1 creates the e-mail and sends the e-mail to the mail address of the destination (client 10a-1) designated by the e-mail, using the mailer.

The e-mail sent from the client 10b-1 is temporarily sent to the mail server 11b, and then the mail server 11b examines the mail address of the destination described in the e-mail and sends the e-mail to the mail server 11a managing the destination client 10a-1.

Then the mail server 11a examines the mail address of the e-mail and stores the e-mail in the mail box of the destination client 10a-1. And the destination receives at the client 10a-1 the e-mail stored in the mail box in the mail server so that it is possible to read the e-mail sent from the client 10b-1 at the client 10a-1.

In this conventional mail system 1', if the mail source has input a wrong mail address for the destination in an e-mail, the e-mail is sent to a wrong destination or the mail servers 11a, 11b notifies the mail source that the e-mail could not been sent because the destination of the e-mail is unknown.

Further, when e-mails of the same content are sent to a plurality of destination concurrently, the mail source creates a group mail list in which mail addresses of these destinations are registered as a set and selects this group mail list as the destinations of the identical e-mails so that the identical e-mails can be sent to the plural mail addresses at once.

FIG. 25 is a flow diagram illustrating the procedure of the conventional mail system 1' when an e-mail has been sent to the old mail address after the mail address was updated.

In FIG. 25, arrows each labeled with a parenthesized number mean the matters "a certain process is carried out" or "a certain process occurs", and the numbers in brackets designate the sequence in which these matters occur. Also in the following description, an arrow labeled with a number in brackets indicates the same meaning.

In FIG. 25, although a single mail server 11a and a single server administrator 14a are arranged on the upper side and a single mail server 11b and a server administrator 14b are arranged on the lower side, it is assumed in the following description that the mail address being managed by the mail server 11a shown on the upper side has been changed to the mail address being managed by the mail server 11b shown on the lower side.

The server administrator 14a manages the mail server 11a, while the server administrator 14b manages the mail server 11b.

In FIG. 25, if the mail address of a destination has been updated, the server administrator 14a deletes the mail address (old mail address) of the destination in the mail server 11a (arrow labeled with (1)), and the server administrator 14b registers the new mail address in the mail server 11b when it becomes aware of the new mail address of the destination (arrow labeled with (4)).

If an e-mail has been sent from the mail source to the old mail address after the old mail address of the destination was deleted in the mail server 11a and before a new mail address of the destination is registered in the mail server 11b (arrow labeled with (2)), the mail server 11a notifies the mail source that the e-mail could not sent because the destination of the e-mail is unknown (error process) (arrow labeled with (3)).

Therefore, in the conventional mail system 1', if the mail address of the destination has been updated, the mail source has to previously confirm a new mail address of the destination to send the e-mall to the new mail address, and has to change the mail address in the address book of the mailer at every updating of a mail address, which would be laborious and time-consuming in maintenance.

Particularly if many mail addresses are registered in the address book of the mailer, the maintenance work would be laborious. For example, if a group mail list is registered in the address book, it is essential to manage all the mail addresses of destinations, which are registered in the group mail list, so as to be kept the latest mail addresses always.

Further, if an e-mail has been sent to a plurality of mail addresses and it has been received from the mail server 11 an error message that the e-mail could not been sent because no destination corresponding to the mail address exists, it is difficult to understand whether the e-mail could not sent to only part of the mail addresses or whether the e-mail could not sent to each and every one of the mail addresses.

Following three attempts are known as solutions to the foregoing problems.

As a first solution, Japanese Patent Laid-Open Publication No. HEI 11-74931 discloses a technology of registering the current mail address and the new mail address on a home page and checks on the home page whether or not the mail address of the destination has been updated.

However, in the technology of Japanese Patent Laid-Open Publication No. HEI 11-74931, it is necessary to check the mail address of the destination on the home page at every time when sending an e-mail. And if this technology is adopted in a mailing list, it is also necessary to always check all the mail addresses registered in the mailing list; when the mail address has been found wrong, the e-mail will now be sent to the intended destination until the mailing list is updated manually.

As a second solution, Japanese Patent Laid-Open Publication No. HEI 11-65960 discloses a technology of describing information, which can specify an individual, in place of a correct account (mail address) if the account (mail address) of the destination is unknown or uncertain and some other personal information is known, so that an e-mail can be sent to the intended destination.

However, in the technology of Japanese Patent Laid-Open Publication No. HEI 11-65960, the mail source has to grasp whether or not the destination employs the system and also has to previously obtain personal information specifying the destination, which would cause a danger that information specifying an individual might be drained as picked up by a malicious third party.

Further, if the sever name (portion after @ in a mail address) has been updated due to provider change, company name change, staff reassignment (transfer) etc., the e-mail cannot be sent to the intended destination until the mail source previously obtains the new mail address of the destination. In the mailing list, it is very difficult to update the individual mail addresses.

As a third solution, Japanese Patent Laid-Open Publication No. HEI 11-184787 discloses a technology that the user, who can use a home page, registers a destination ID in URL (uniform Resource Locator) of its own home page to notify the destination.

However, in the technology of Japanese Patent Laid-Open Publication No. HEI 11-184787, it is absolutely essential to correlate the home page and member-dedicated BBS (Bulletin Board System) with each other so that the whole procedure of this technology cannot be achieved with BBS. Namely, it is impossible to complete all the processes only with the e-mail, which would be inconvenient.

Some types of the mail server 11 restricts receivable data size (data capacity) for a single e-mail; if an e-mail whose size exceeds the data capacity has been sent, the e-mail cannot be sent or part of the e-mail would be lost.

As a consequence, if an e-mail of the size exceeding the data capacity has been sent, the mail source has to compress or divide the e-mail into a size smaller than the data size receivable by the mail server 11. At that time, the mail source has to check various restrictions on the system, such as the data capacity of the destination, which of division and compression should be used, and the combining or extracting (extending to the original data) method usable by the destination, which would be laborious and time-consuming.

Further, if the mail source user sends an e-mail to plural clients 10, it is essential that the address book of the mailer at each of all the clients 10 to be used should be updated to have the latest mail addresses. And if different mailers are set in the individual clients 10, it would be difficult to share the address book.

SUMMARY OF THE INVENTION

With the foregoing problems in view, it is an object of the present invention to provide a mail system, a mail managing apparatus, a mail transmitting terminal, a mail transmitting method, and computer-readable recording medium storing a mail-managing-program, in which the mail source can send an e-mail exactly to an updated mail address of the destination without being conscious with not only the updating of the destination mail address but also any restriction on a system environment of the destination.

In order to attain the above object, according to a first generic feature of the present invention, in a mail system, an mail managing apparatus, a mail transmitting method, and a computer-readable recording medium in which a mail managing program is recorded, when a mail address of a destination has been updated, the old mail address and a new mail address of the destination are registered in correlation with each other, and if an e-mail is designated to be sent to the destination at the old mail address, the last-named e-mail is sent to the destination at the new mail address.

Preferably if an e-mail is designated to be sent to the destination at the old mail address, the e-mail may be sent to the destination at the new mail address.

According to a second generic feature of the present invention, there is provided a mail system for sending an e-mail from a mail source to one or more destinations at their respective mail addresses, comprising: a system environment storage section for storing information about a system environment of the individual destination; a mail processing section for processing e-mail data, which is contained in the e-mail from the mail source, into such a form receivable by the destination based on said system environment information of the last-named destination which information is stored in said system environment storage section; and a mail sending section for sending the processed e-mail to the destination.

With this second generic feature, the e-mail to be sent is processed into a form such as to be receivable by the destination according to the system environment of the destination.

According to a third generic feature of the present invention, there is provided a mail system for sending an e-mail from a mail source to one or more destinations at their respective mail addresses, comprising: an address list in which the destination mail addresses are registered; and a mail address rewriting section, operative upon receipt of a notice that the mail address of at least one destination has been updated, for rewriting such old destination mail address, which is registered in said address list, into a new destination mail address.

With this third generic feature, the old mail address registered in the address list is rewritten into a new mail address of the destination when a notice that the old mail address of the destination has been updated is received.

Therefore, the mail system, the mail managing apparatus, the mail transmitting method and the computer-readable recording medium in which the mail system program is recorded, have the following advantageous results:

(1) If the mail address of a particular destination has been updated, the old mail address and a new mail address of the particular destination are registered in correlation with each other so that an e-mail can be sent exactly to an intended destination even when the mail address of the destination has been updated.

(2) As it is notified that the mail address of a particular destination has been updated, the mail source can rewrite the mail address of the particular destination in an e-mail address book.

(3) As the mail address rewriting section rewrites the mail address of a particular destination in an e-mail address book upon receipt of a notice that the mail address of the particular destination has been updated, a new mail address is automatically registered in the e-mail address book, thus improving the reliability of the mail system.

(4) If an e-mail has been sent to the destination at the old mail address before registration of the new mail address, the e-mail is stored until the new mail address is registered, so that the e-mail can be sent exactly to the intended destination upon registration of the new mail address.

(5) By previously registering the mail address of a particular destination and attribute information relating to the particular destination in correlation with each other and then inputting the attribute information in place of the mail address when sending an e-mail to the particular destination, it is possible to send an e-mail exactly to an intended particular destination without inputting the mail address even when the mail address of the particular destination has been updated.

(6) It is possible to send an e-mail to the destination as e-mail data contained in an e-mail from the mail source is processed into a form receivable by the destination based on the system environment information of the destination, so that the resulting e-mail can be received exactly by the destination.

(7) Upon receipt of the notification that the mail address of the destination has been updated, the mail source terminal consults with registration time information about when the mail address of the destination was registered by a registration time information recording section and rewriting the mail address of the destination in an e-mail address book according to the registration time information. Since the updated mail address of a destination is automatically registered in the e-mail address book, it is possible to improve the reliability of the mail system.

BRIEF DESCRIPTION OF THE DRAWINGS

FIG. 5 shows a typical notification of updating of a mail address which notification to be sent from the managing server in the mail system of the first embodiment;

DESCRIPTION OF THE PREFERRED EMBODIMENTS

Various embodiments of the present invention will now be described with reference to the accompanying drawings.

Figure 1:
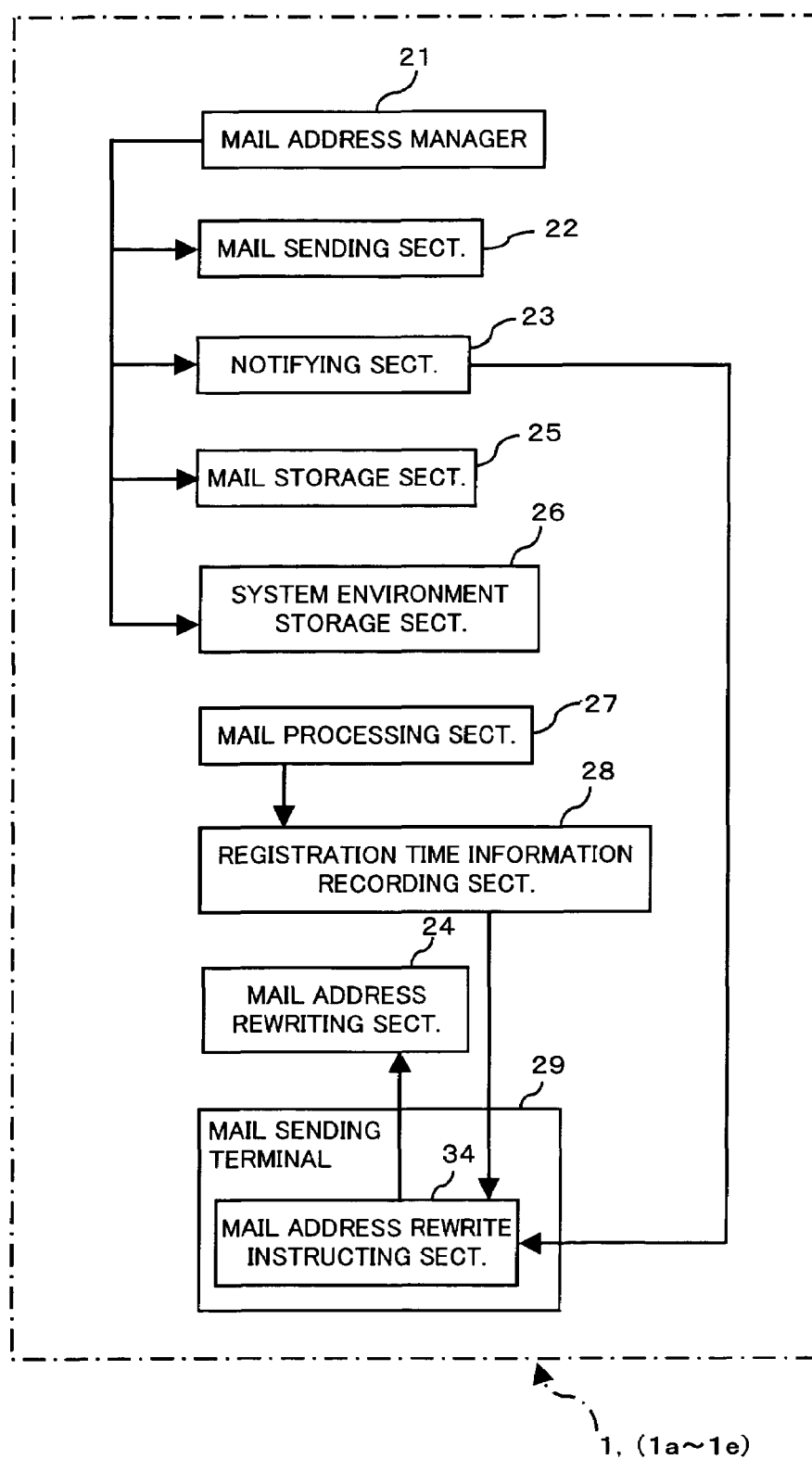
FIG. 1 is a block diagram illustrating an aspect of the present invention.

(A) Description of Aspect of the Invention:

FIG. 1 is a block diagram illustrating an aspect of the present invention. A mail system 1 representing the aspect of the invention sends an e-mail from a non-illustrated mail source to a non-illustrated destination at a mail address, and comprises, as shown in FIG. 1, a mail address manager 21, a mail sending section 22, a notifying section 23, a mail storage section 25, a system environment storage section 26, a mail processing section 27, a registration time information recording section 28, and a mail server (not shown in FIG. 1). The mail system 1 is also equipped with a mail sending terminal 29 having a mail address rewriting section 24.

The mail address managing section 21 manages the mail addresses of destinations. If the mail address of a particular destination has been updated, the mail address managing section 21 registers the old mail address of the destination and a new address in correlation with each other. Further, the mail address managing section 21 registers the old and new mail addresses of the particular destination attribute information of the particular destination in correlation with each other.

If an e-mail has been sent to the old mail address of the destination after the mail address of the destination was updated, the mail sending section 22 sends the e-mail to a new mail address of the destination. Further, the mail sending section 22 sends to the destination an e-mail processed by the later-described mail processing section 27.

The notifying section 23 notifies the mail source (mail sending terminal 29) of a fact that the mail address of the destination has been updated. If an e-mail has been sent to the old address of the destination after the mail address of the destination was updated and before a new mail address is registered in the mail address managing section 21, the mail storage section 25 stores the last-named e-mail until the new address of the destination is registered.

The system environment storage section 26 stores system environment information of the destination, and the mail processing section 27 processes e-mail data, which is contained in an e-mail from the mail source, into a form receivable by the destination in accordance with the system environment information of the destination stored in the system environment storage section 26.

Further, the registration time information recording section 28 registers an mail address of the destination and registration time information, which specifying when the last-named mail address was registered, in correlation with each other. In the meantime, the mail sending terminal 29 has the mail address rewriting section 24. Upon receipt of notification from the notifying section 23 that the mail address of a particular destination has been updated, the mail address rewriting section 24 consults with registration time information regarding the mail address of the particular destination and registered by the registration time information recording section 28 and rewrites the mail address of the destination in an e-mail address book in accordance with the registration time information.

In the thus constructed mail system 1 of the present invention, since, if the mail address of a particular destination has been updated, the mail address managing section 21 registers the old mail address and a new mail address of the particular destination in correlation with each other to thereby manage the mail address of the particular destination, an e-mail can be automatically sent exactly to an intended destination even if the mail address of the intended destination has been updated.

Further, since the mail processing section 27 processes e-mail data, which is contained in an e-mail from the mail source, into a form receivable by a particular destination based on the system environment information of the particular destination, an e-mail can be received reliably by the destination. Furthermore, upon receipt of the notification that the mail address of the destination has been updated, the mail address rewriting section 24 consults with the registration time information of the mail address of the destination, which information is registered by the registration time information recording section 28, and rewrites the mail address of the destination in the e-mail address book in accordance with the registration time information. Thus a new mail address of the individual destination is automatically registered in the e-mail address book, so an improved degree of reliability of the mail system can be achieved.

(B) First Embodiment

Figure 2:
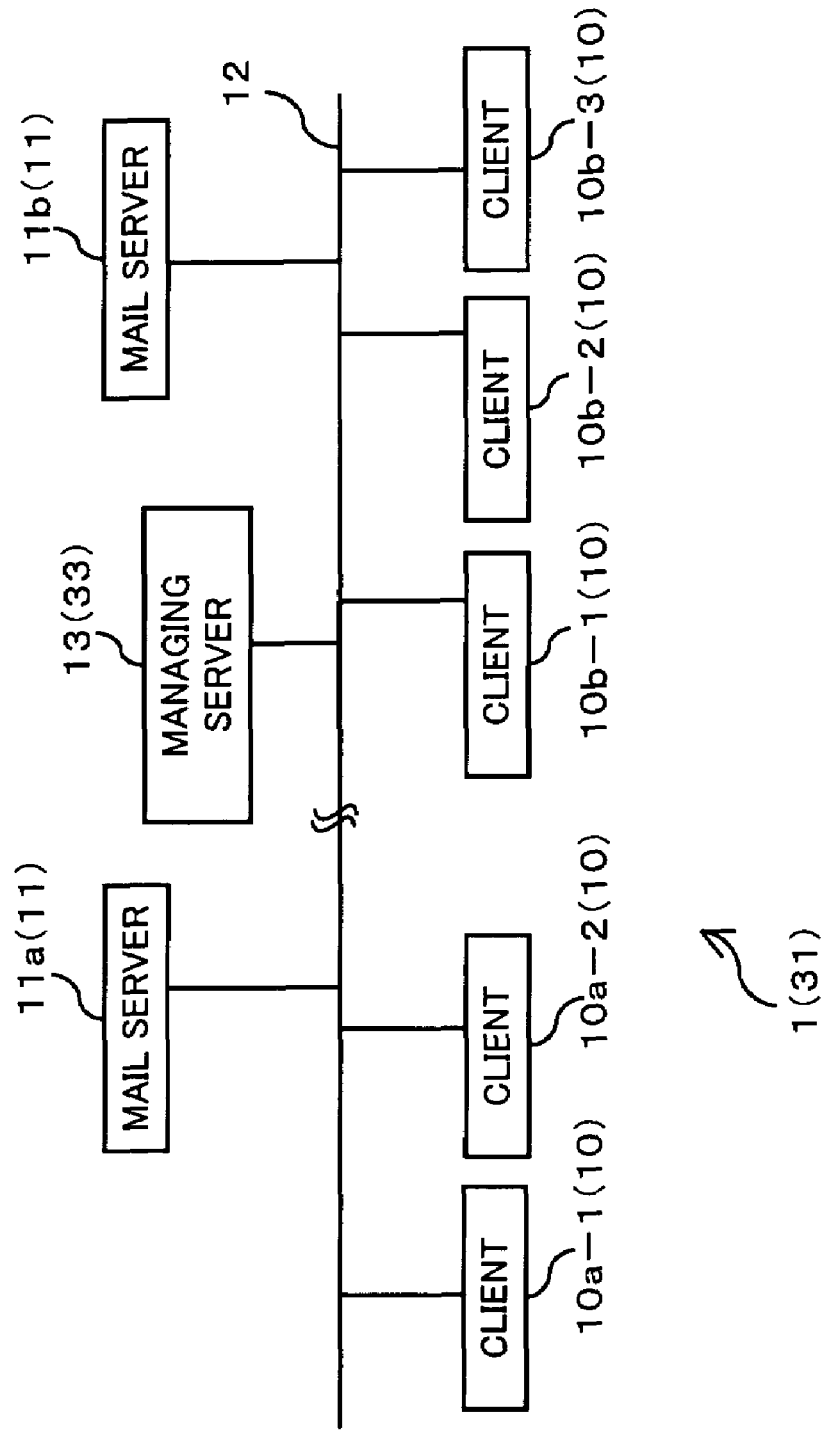
FIG. 2 is a block diagram schematically showing a mail system according to first and second embodiment of the present invention.
Figure 3:
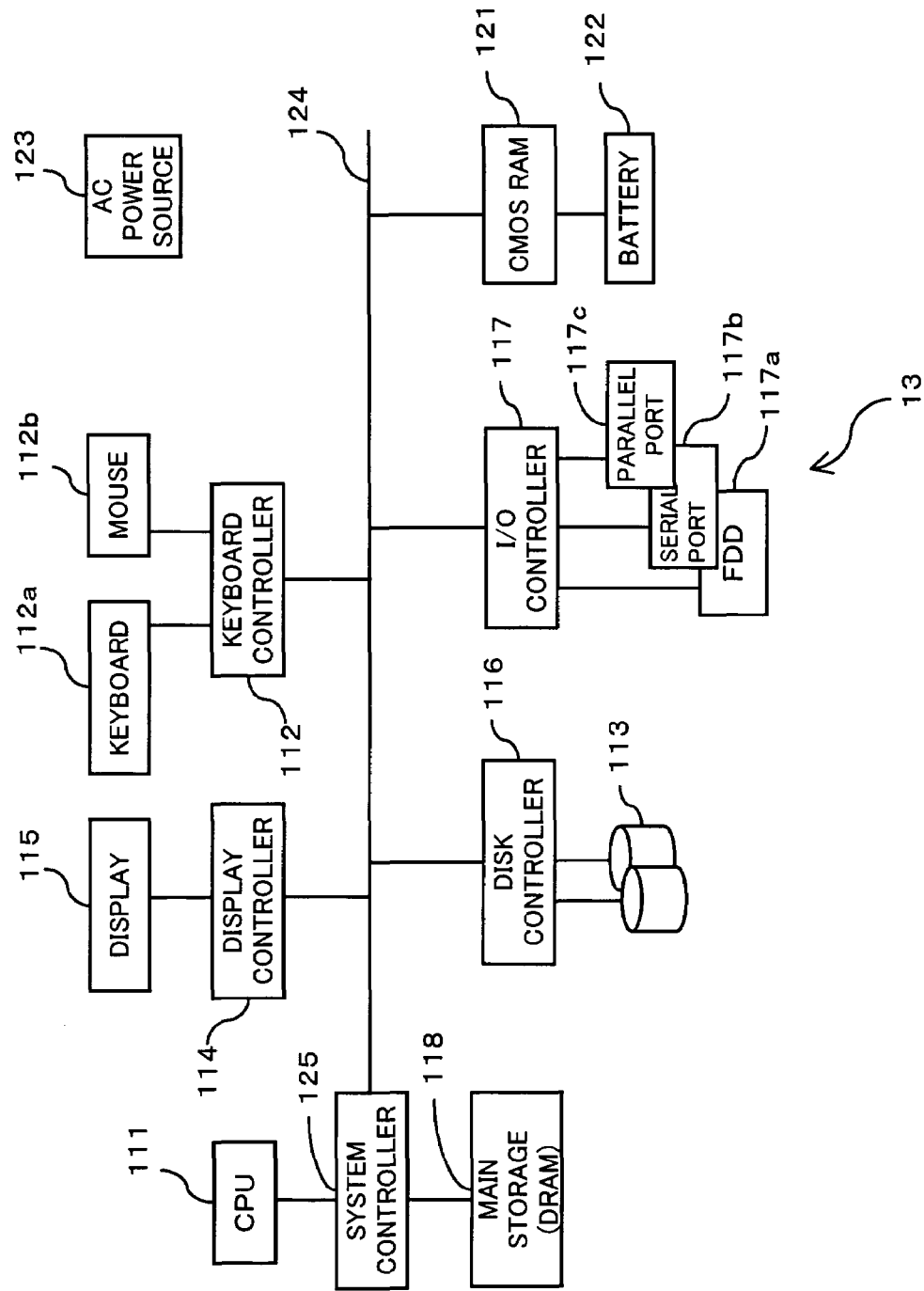
FIG. 3 is a block diagram illustrating hardware of a managing server of the mail system of the first embodiment.
Figure 4:
FIG. 4 shows a mail address management table to be managed by the managing server in the mail system of the first embodiment.

FIG. 2 is a block diagram of a mail system according to a first embodiment of the present invention, FIG. 3 is a block diagram illustrating hardware of a manager server in the mail system of the first embodiment, and FIG. 4 shows a mail address management table to be managed by the manager server in the mail system of the first embodiment.

Figure 24:
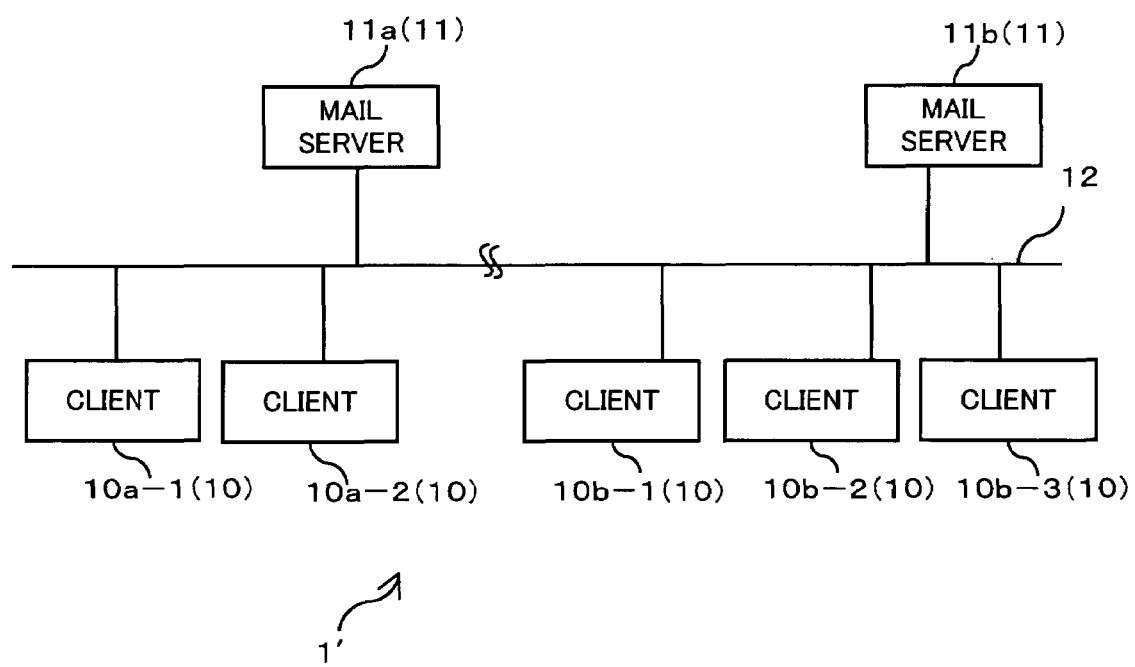
FIG. 24 is a block diagram showing a conventional mail system.
Figure 25:
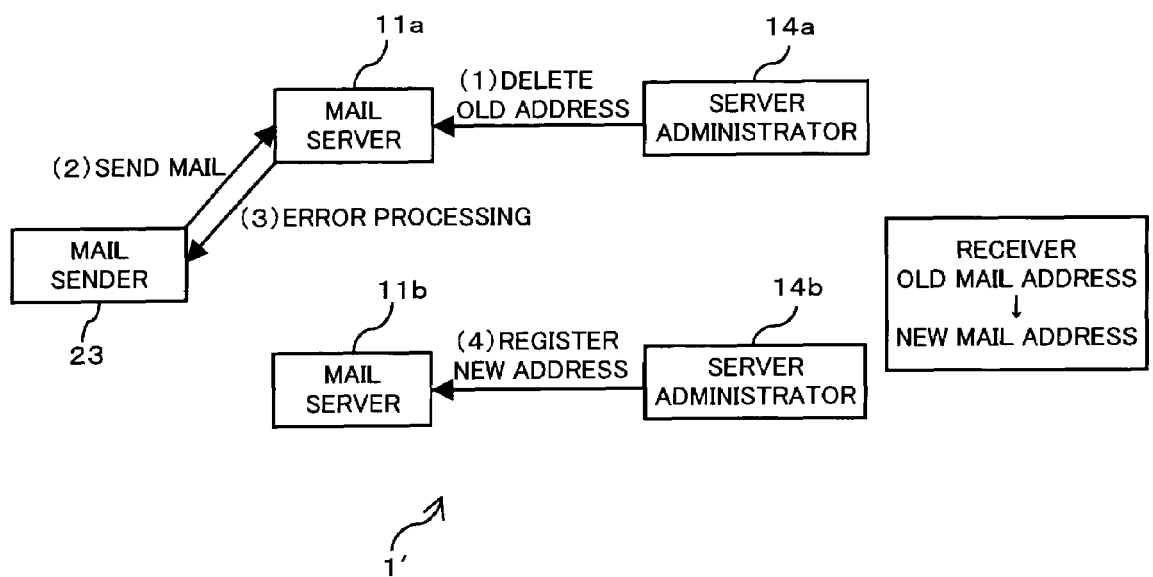
FIG. 25 illustrates the manner in which an e-mail flows when the e-mail has been sent to the old mail address after the mail address was updated in the conventional mail system.

The mail system 1 of the first embodiment sends an e-mail from a mail source to a mail address of a destination and comprises, as shown in FIG. 2, a manager server 13 in addition to the various elements of the conventional mail system 1' described above at "Description of Related Art" of this specification in connection with FIG. 24.

Namely, the mail system 1, as shown in FIG. 2, comprises mail servers 11 (11a, 11b), clients 10 (10a-1, 10a-2, 10b-1 through 10b-3), a network 12, and the manager server (mail address manager) 13; the mail servers 11, the clients 10 and the manager server 13 are interconnected via the network 12.

In operation, the individual mail server 11 (11a, 11b) sends an e-mail, which has been sent by a mail source (client 10), to a destination (client 10) in accordance to a designated mail address of the e-mail. Specifically, the individual mail server manages a plurality of mail boxes (not shown) so that e-mails sent from the clients 10 are stored separately in the plural mail boxes.

The e-mails stored in these mail boxes can be read or inspected and sent to a mailer (mail sending/receiving program) of the individual client 10 according to requests from users (clients 10).

The mail server 11 is substantially identical in construction with the manager server described later in connection with FIG. 3, so its description is omitted here.

For updating the mail address, the old mail address is deleted in the mail server 11 in charge of managing old mail addresses, and a new address is registered in a mail server 11 in charge of managing new addresses.

The mail system 1 of the first embodiment shown in FIG. 2 comprises two mail servers 11a, 11b, and five clients 10 (10a-1, 10a-2, 10b-1 through 10b-3). The mail server 11a and the mail server 11b respectively manage sending/receiving of e-mails with respect to the clients 10a-1, 10a-2 and sending/receiving of those with respect to the clients 10b-1 through 10b-3.

For convenience, it is assumed that, using a particular terminal among a plurality of clients 10a-1, 10a-2, 10b-1 through 10b-3, the user sends/receives an e-mail. Different mail addresses are assigned one to each of the clients 10, each mail address being peculiar to a respective client 10.

In the following description, reference alphanumeric symbol 11a or 11b is used to designate a single particular one of the plural mail servers, and reference number 11 is used to designate an arbitrary mail server.

Likewise, reference alphanumeric symbol 10a-1, 10a-2, 10b-1 through 10b-3 is used to designate a single particular one of the plural clients, and reference number 10 is used to designate an arbitrary client.

The managing server 13 includes, as shown in FIG. 3, a CPU 111, a keyboard controller 112, a hard disk (mail storage section) 113, a display controller 114, a display (e.g., CRT or LCD) 115, a disk controller 116, an I/O (input/output) controller 117, a primary storage unit (DRAM) 118, a bus 124, a system controller 125, and a power source 123.

The hard disk 113 is a storage unit in the managing server 13, and functions as a mail storage section 25 (FIG. 1) for storing an e-mail, which has been sent out from a mail source to a particular destination after the mail address of the particular destination was updated and before a new mail address is registered in a later-described mail address management table (FIG. 4), until the registration of the new mail address.

In the first embodiment, the hard disk 113 is build in the managing server 13. Alternatively the hard disk 113 may be an accessory to the managing server 13.

The CPU 111 performs various arithmetic processes and control processes by executing a program. The CPU 111 operates so as to control various kinds of hardware (input/output unit and peripheral equipment), such as a system controller 125, a keyboard 112a, a mouse 112b, a display 115, a floppy disk drive (FDD) 117a, and the hard disk 113, by executing a program read out from, for example, the hard disk 113.

Specifically, the system controller 125 controls the display 115 via the display controller 114, the keyboard 112a and the mouse 112b via the keyboard controller 112, the hard disk 113 via the display controller 116, the FDD 117a, and the serial port 117b and the parallel port 117c via the I/O controller 117.

The CPU 111 renders the managing server 13 to function as the mail address manager 21, the mail sending section 22, the notifying section 23, the mail address rewriting section 24, and the mail storage section 25 by executing the program.

The DRAM 118 is used as working areas when the CPU 111 execute various arithmetic processes; for example, the program read out from the hard disk 113 is stored in this DRAM 118. The power source 123 supplies electric power to various devices of the managing server 13.

In the managing server 13, as shown in FIG. 4, the hard disk 113 has the mail management table 30 for managing the old mail address and a new mail address in correlation with each other. If a mail address under management of the managing server 13 has been updated, the managing server 13 registers the old mail address and a new address in mail address management table 30 in correlation with each other.

Namely, the managing server 13 is a management unit for managing sending of e-mails, serving as the mail address manager 21 (FIG. 1) for managing the mail addresses of destinations and registering the old mail address and a new mail address of a particular destination if the mail address of the particular destination has been updated.

If it takes some time for a new mail address to be assigned after the old mail address has become invalid due to the updating of the mail address, it is desirable to register firstly only the old mail address in the mail address management table 30, and then a new mail address in the mail address management table 30 as soon as the new mail address has been assigned.

The managing server 13 serves also as the mail sending section 22 (FIG. 1) which compares the mail address of an e-mail (to be sent) compared with the mail address management table 30, and sends the e-mail to a new address if the e-mail is addressed to the old mail address though the mail address has been updated.

FIG. 5 shows a typical notification of updating of a mail address which notification to be sent from the managing server 13. If the mail address of an e-mail from the mail source is registered in the mail address management table 30 as the old mail address, the managing server 13 sends an e-mail notifying the updating of the mail address as shown in FIG. 5.

This mail address updating notification describes the old mail address (expired address) and a new mail address (changed address) in a predetermined format as well as a message urging the mail source to update an address book of the mailer.

Namely, the managing server 13 functions as the notifying section 23 (FIG. 1) for notifying the mail source that the mail address of the destination has been updated.

The individual client 10 is a mail sending terminal 29 (FIG. 1) for sending an e-mail and is substantially identical in hardware structure with the managing server of FIG. 3, so the description of the hardware structure is omitted here.

A mailer (e-mail sending/receiving program) is installed in a non-illustrated hard disk of the client 10. As it is executed by the CPU, this mailer creates an e-mail and sends this e-mail to an designated mail address (destination) as well as receives an e-mail from another mail address (mail source).

Specifically, an e-mail created in the client 10 is sent temporarily to the mail server 11, whereupon the mail server 11 sends the e-mail to the destination in accordance with the designated mail address.

The mailer set in each client 10 has an e-mail address book which registers the mail address of an individual destination and destination identification (ID) information (e.g., name, residence, assignment) in correlation with each other. In use, by selecting a desired destination for an e-mail from the e-mail address book when creating the e-mail, the user can send the e-mail to the destination without difficulty.

Further, the client 10 has in the hard disk a mail address updating script for extracting, upon receipt of a mail address updating notification from the managing server 13, the old and new mail addresses from the mail address updating notification and rewriting the old mail address, which is registered in the e-mail address book of the mailer, into the new address. As this script is executed by the CPU, the client 10 functions as the mail address rewriting section 24 (FIG. 1) for rewriting the e-mail address book.

This mail address updating script is in the form of a library composed of a plurality of scripts corresponding to various mailers and system environments of the respective clients 10 so that a necessary script among the library can be selectively executed in accordance with the used environment of the client 10 and the kind of the mailer.

Figure 6:
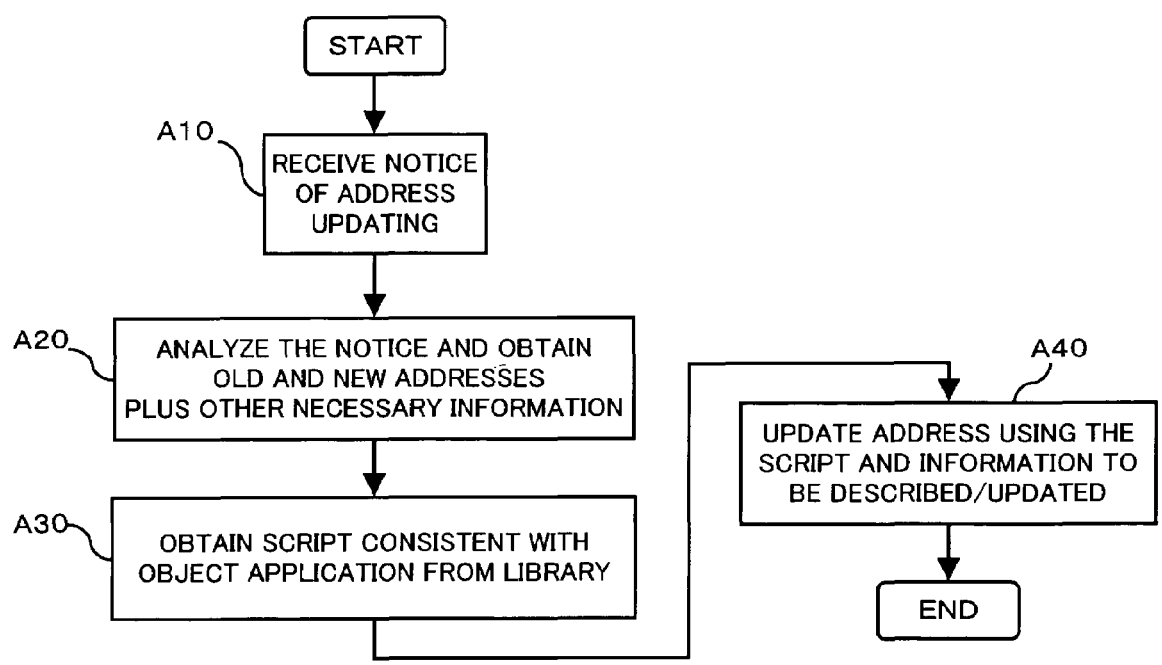
FIG. 6 is a flow diagram illustrating how to update a mail address using a mail address updating script in the mail system of the first embodiment.

How to update the mail address according to the mail address updating script will now be described with reference to the flow diagram (steps A10 through A40) of FIG. 6. Upon receipt of the mail address updating notification from the managing server 13 (step A10), the client 10 analyzes the mail address updating notification and extracts the new and old addresses as well as other information, if necessary (step A20).

Then the client 10 obtains, from the library of the mail address updating scripts, a script corresponding to the system environment (e.g., the type of the mailer) (step A30), and rewrites the old address in the e-mail address book of the mailer into a new address (step A40).

In the first embodiment, the address book updating script rewrites the old mail address of the e-mail address book into a new address based on the notification of updating. Alternatively the user may manually input the old and new mail addresses. Various changes or modifications may be suggested without departing from the gist of the invention.

In the above-mentioned mail system 1, for example, in order to send an e-mail from the client 10b-1 (mail source) to the client 10a-1 (destination) in FIG. 2, firstly an e-mail is created at the mail-source client 10b-1 and then the mail address of the destination is input by designating from the e-mail address book or directly input, whereupon the e-mail is sent to the mail address of the destination (client 10a-1).

The e-mail sent from the client 10b-1 is temporarily sent to the mail server 11b where the mail server 11b examines the mail address described in the e-mail and then sends the e-mail to the mail server 11a which manages the mail address of the mail-destination client 10a-1.

The mail server 11a examines the mail address of the received e-mail and stores the e-mail in the mail box at the destination mail address (client 10a-1) Then the destination client 10a-1 obtains the e-mail stored in the mail box of the mail server 11a using the mailer. Thus the destination client 10a-1 can receive the e-mail from the mail source.

In order to send e-mails of the identical content to a plurality of destinations at once, the mail source creates a group mail list in which respective mail addresses of the plural destinations and select the group mail list as the destinations of the e-mails. Thus every destination in the group mail list can receive the same e-mail at once.

Figure 7:
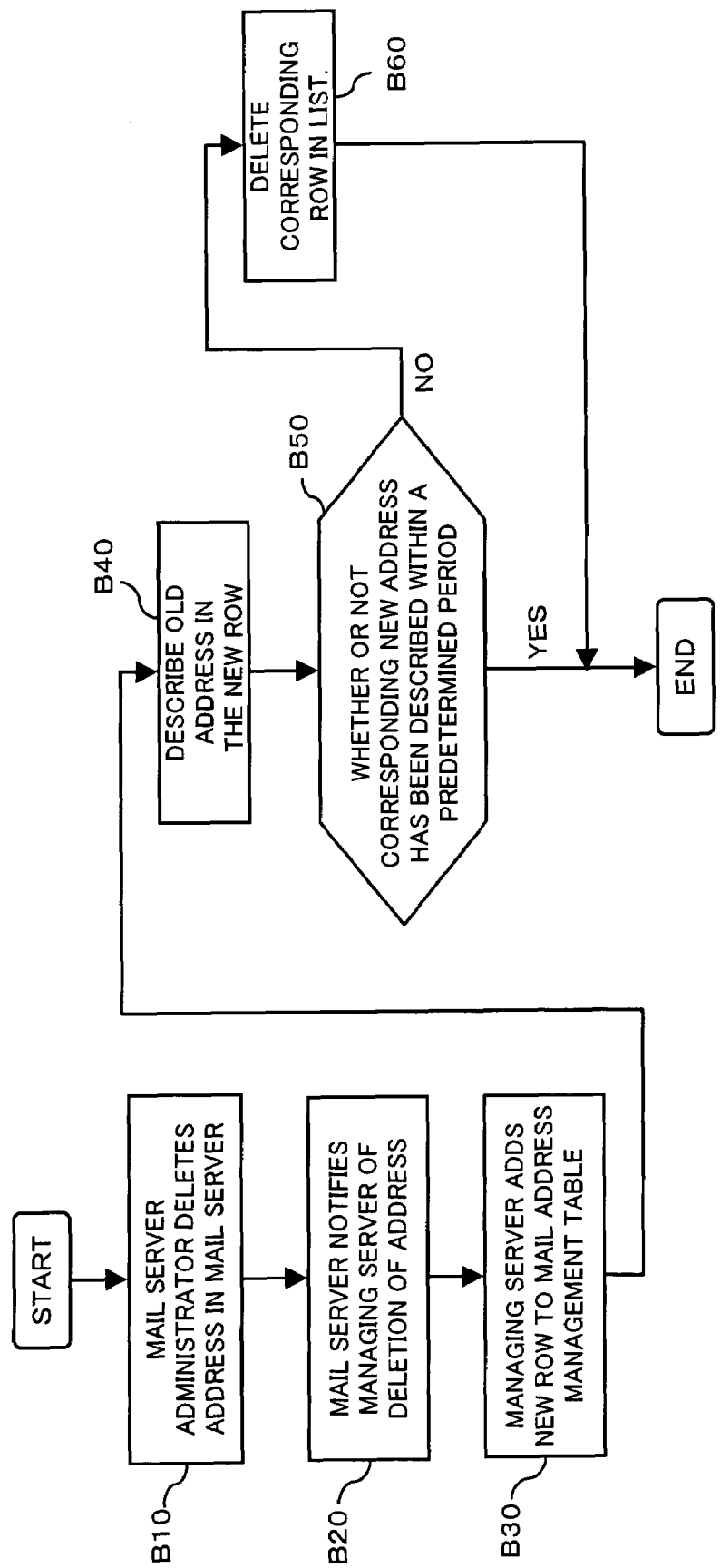
FIG. 7 is a flow diagram illustrating how to update the mail address management table by the managing server in response to the updating of a mail address in the mail system of the first embodiment.

How to process the mail address management table of the managing server 13 in the mail system 1 of the first embodiment when the mail address has been updated will now be described with reference the flow diagram (steps B10 through B60) of FIG. 7.

The server administrator 14 (FIG. 11) manages the mail server 11 and the managing server 13. But when updating the mail address, the server administrator 14 deletes the old mail address in the mail server 11 under the management of the server administrator 14 (step B10), and the mail server 11 notifies the managing server 13 of the deleted mail address to request for deletion of the old mail address in the mail address management table 30 (step B20).

The managing server 13 adds a new row to the old address column in the mail address management table 30 (step B30), and then stored the mail address in the old address column at the added row (step B40). At this moment, since a new address is unknown, only the old mail address is described.

After lapse of a predetermined time, the managing server 13 examines whether or not a new mail address corresponding to the old mail address has been input (step B50). If no such corresponding new address has been input (NO route of step B50), the managing server 13 deletes in the mail address management table 30 the row in which only the old mail address is registered (step B60), terminating the process.

If the new mail address has been defined and so the server administrator 14 has notified the managing server 13 of the new mail address and the old mail address in correlation with each other via the mail server 11 (YES route of step B50), the managing server 13 terminates the process with the old and new mail addresses registered in the mail address management table 30 in correlation with each other.

Figure 8:
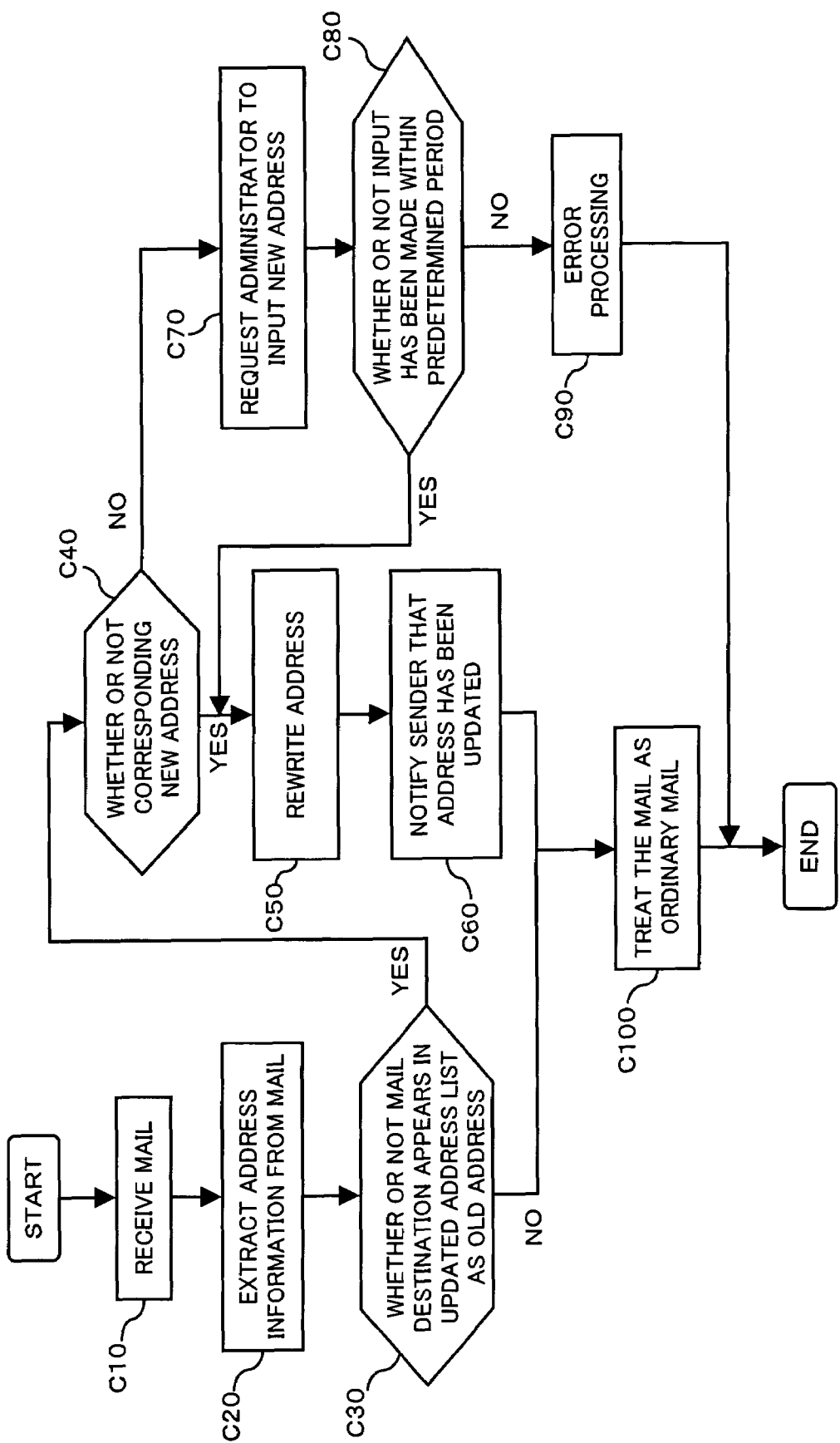
FIG. 8 is a flow diagram illustrating the procedure of the managing server when sending an e-mail in the mail system of the first embodiment.

The process of the managing server 13 to send an e-mail in the mail system 1 of the first embodiment will now be described with reference to the flow diagram (steps C10 through C100) of FIG. 8.

Upon receipt of an e-mail from the mail server 11 (step C10), the managing server 13 extracts the mail address of the destination from the received e-mail (step C20) and examines whether or not the same mail address as the extracted mail address is registered in the mail address management table 30 (step C30).

If such mail address is registered in the mail address management table 30 as the old mail address (NO route of step C30), the managing server 13 sends the e-mail to the mail server 11, which manages the mail address described in the e-mail, as it is as an ordinary e-mail (step C100).

If the identical mail address is registered in the mail address management table 30 as the old mail address (YES route of step C30), the managing server 13 examines whether or not a new address corresponding to the old mail address is registered in the mail address management table 30 (step C40).

Then if the corresponding new mail address is registered in the mail address management table 30 (YES route of step C40), the managing server 13 rewrites the mail address of the e-mail into the new mail address registered in the mail address management table 30 (step C50) And the managing server 13 sends to the destination an e-mail notifying that the mail address has been updated (step C60), whereupon the procedure goes to step C100.

Otherwise if no corresponding new address is not registered in the mail address management table 30 (NO route of step C40), the managing server 13 temporarily stores the e-mail in the hard disk 113 of the managing server 13, and notifies the server administrator 14 of the fact that no new mail address corresponding to the old mail address is registered, pressing the server administrator 14 to input the new address (step C70).

Namely, if only the old mail address is registered in the mail address management table 30 though the mail address of the destination has been updated, the managing server 13 functions as the mail storage section 25 (FIG. 1) to hold the e-mail until the new mail address is registered in the mail address management table 30 and then to send the e-mail to the new mail address of the destination upon registration of the new mail address.

If a string of characters presumably indicating "classified or confidential" is described in the title or in body of the e-mail, the managing server 13 may delete without either sending or suspending. Particularly if the e-mail in which a string of characters presumably indicating "classified or confidential" lacks a part of the mail address (e.g., domain), it is desirable to discard the e-mail.

Further, the managing server 13 examines whether or not a new mail address has been input within a predetermined time (step C80), and if the result of the examination is positive (YES route of step C80) the procedure goes to step C50.

Otherwise if the result of the examination is negative (NO route of step C80), the managing server 13 performs an error process pressing the server administrator 14 to input the new mail address again(step C90), and holds the e-mail in the hard disk 113 until the new mail address is input.

If finally the new mail address has not been input, the managing server 13 returns the e-mail to the mail source.

Figure 9:
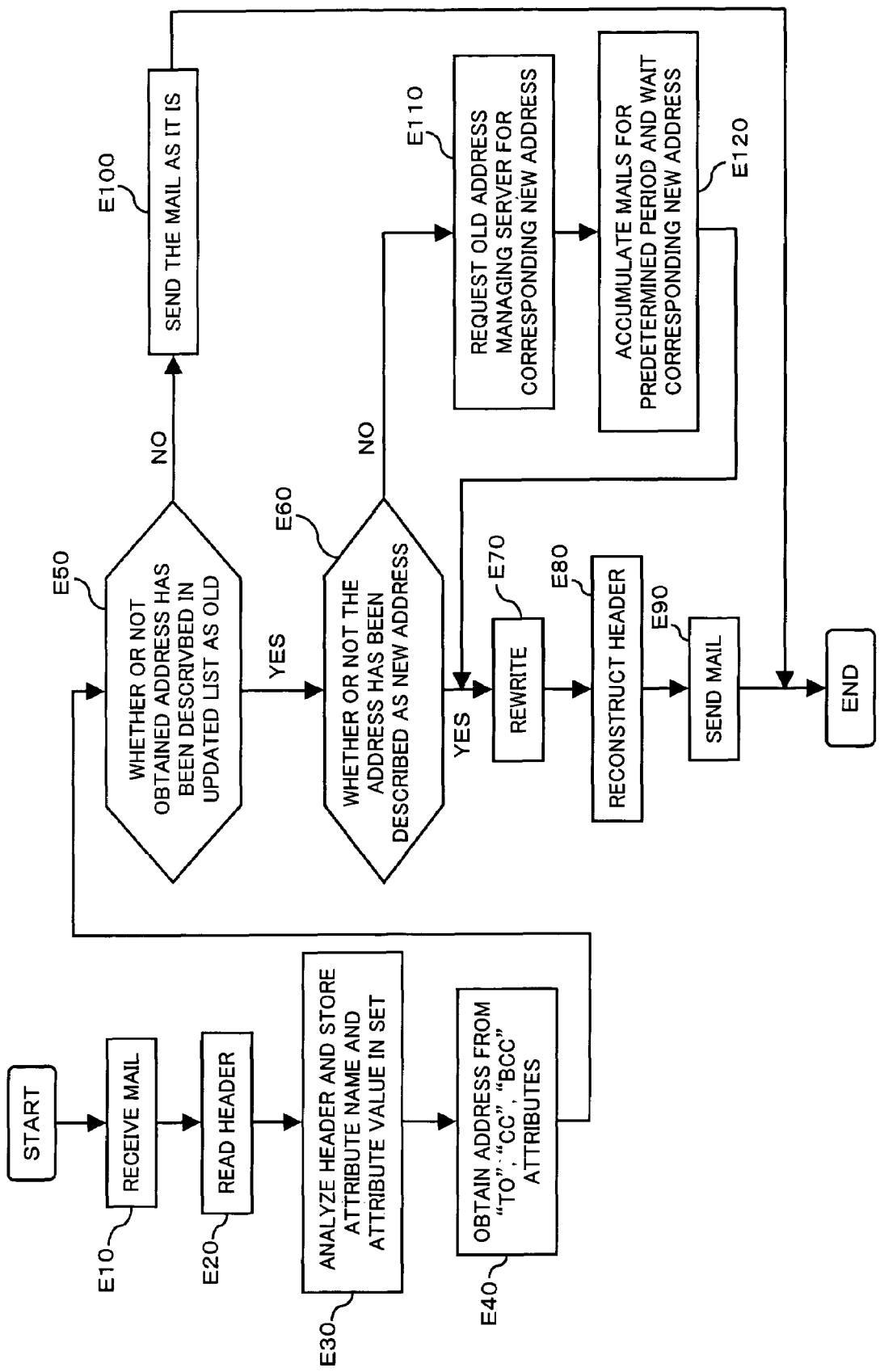
FIG. 9 is a flow diagram illustrating how to send an e-mail to a new address under the management of the managing server in the mail system of the first embodiment.

The process of the managing server 13 to send an e-mail to a new mail address in the mail system 1 of the first embodiment will now be described with reference to the flow diagram (steps E10 through E120) of FIG. 9. In FIG. 9, the steps corresponding to steps C80 and C90 of FIG. 8 are omitted.

Upon receipt of an e-mail (step E10), the managing server 13 reads a header of the e-mail (step E20), analyzes the content of the header, extracts a set of "attribute name" and "attribute value" (step E30), and obtains the attribute values for attributes "CC" and "BCC" (step E40).

At that time, because each of these attribute values is in the form of a list of two or more mail addresses on many occasions, the managing server 13 divides the list into individual mail addresses.

The managing server 13 discriminates whether or not each obtained mail address is registered in the mail address management table 30 as the old mail address (step E50). If the result of this discrimination is negative (NO route of step E50), the managing server 13 sends the e-mail to the last-named mail address (step E100).

Otherwise if the result of the discrimination is positive (YES route of step E50) the managing server 13 discriminates whether a new address corresponding to the old mail address is registered (step E60).

If the new mail address is registered (YES route of step E60), the managing server 13 rewrites the mail address of the e-mail into the new mail address registered in the mail address management table 30 (step E70), reconstructs the header of the e-mail (step E80), and sends the resulting e-mail to the new mail address (step E90).

Otherwise if no new address is registered (NO route of step E60), the managing server 13 presses the mail server 11, which manages the old address, to input a new mail address (step E110), holds the e-mail for a predetermined time so that a new mail address is input (step E120). When the new address has been input, the procedure go to step E70. If no new address has been input within the predetermined time, the managing server 13 returns the e-mail to the mail source.

In the mail system 1 of the first embodiment, if no new mail address is registered, the managing server 13 stores the e-mail in the hard disk 113. Alternatively, the e-mail may be stored in the hard disk of the mail server 11, which manages the old mail address.

Desirably, if the mail server 11 stores the e-mail, the mail server 11 confirms that the new mail address is registered in the mail address management table 30 of the managing server 13 rather than the mail server 11, and then sends the server administrator 14 a notification pressing the server administrator 14 to input the new mail address.

Further, upon receipt of the e-mail whose mail destination mail address has been updated, the managing server 13 confirms information (e.g., the mail server 11 managing the new mail address) about the new mail address with respect to the mail server 11, which manages the old mail address), thereby making confirmation of the new address with respect to the mail server 11 managing the new mail address.

Furthermore, the managing server 13 may periodically make a check to the individual mail server 11 for possible mail address updating, and may update the old address column in the mail address management table 30 in accordance with the result of this checking.

Figure 10:
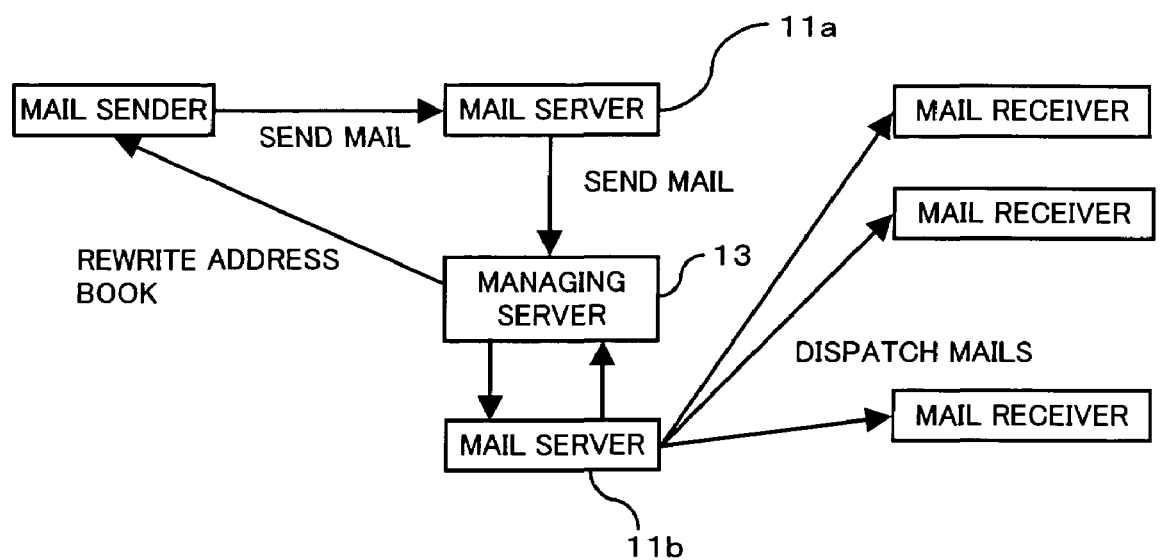
FIG. 10 illustrates the manner in which an e-mail flows in the mail system of the first embodiment.

FIG. 10 is a diagram illustrating the manner in which an e-mail flows in the mail system 1 of the first embodiment. Assuming that an e-mail is to be sent to a particular destination (e.g., the client 10b-1 through 10b-3) whose domain is different from that of the mail source (e.g., the client 10a-1), namely, whose mail address is managed by a mail server 11 (e.g., the mail server 11b) different from the mail server 11 (e.g., the mail server 11a) who manages the mail address of the mail source, the e-mail to be sent from the mail source is firstly sent to the mail server 11a and then sent to the managing server 13.

The managing server 13 compares the mail address of the e-mail with every mail address registered in the mail address management table 30, and if no such mail address is registered in the mail address management table 30, the managing server 13 sends the e-mail to the mail server 11b so that the e-mail may be sent to the mail address designated in the e-mail.

Otherwise if the mail address of the e-mail is registered in the mail address management table 30 as the old address and also a new mail address corresponding to the old mail address is registered in the mail address management table 30, the managing server 13 sends the e-mail to a predetermined mail server 11 (mail server 11b) to send the e-mail to this new mail address. Further, the managing server 13 sends to the mail source a notification that the mail address of the e-mail has been updated, as shown in FIG. 5.

If the result of the comparison indicates that the mail address of the destination has been updated and a new address corresponding to the old address has not yet registered, the managing server 13 temporarily stores the e-mail until the new mail address is registered in the mail address management table 30 and sends the e-mail to the destination at the new mail address upon registration of the new address.

The e-mail is sent from the managing server 13 to the mail server 11b where the e-mail is stored in a mail box corresponding to the new mail address of the destination. Then the destination user obtains the e-mail stored in the mail box of the mail server 11b using the mailer of the client 10 (10b-1 through 10b-3), thereby receiving the e-mail.

Figure 11:
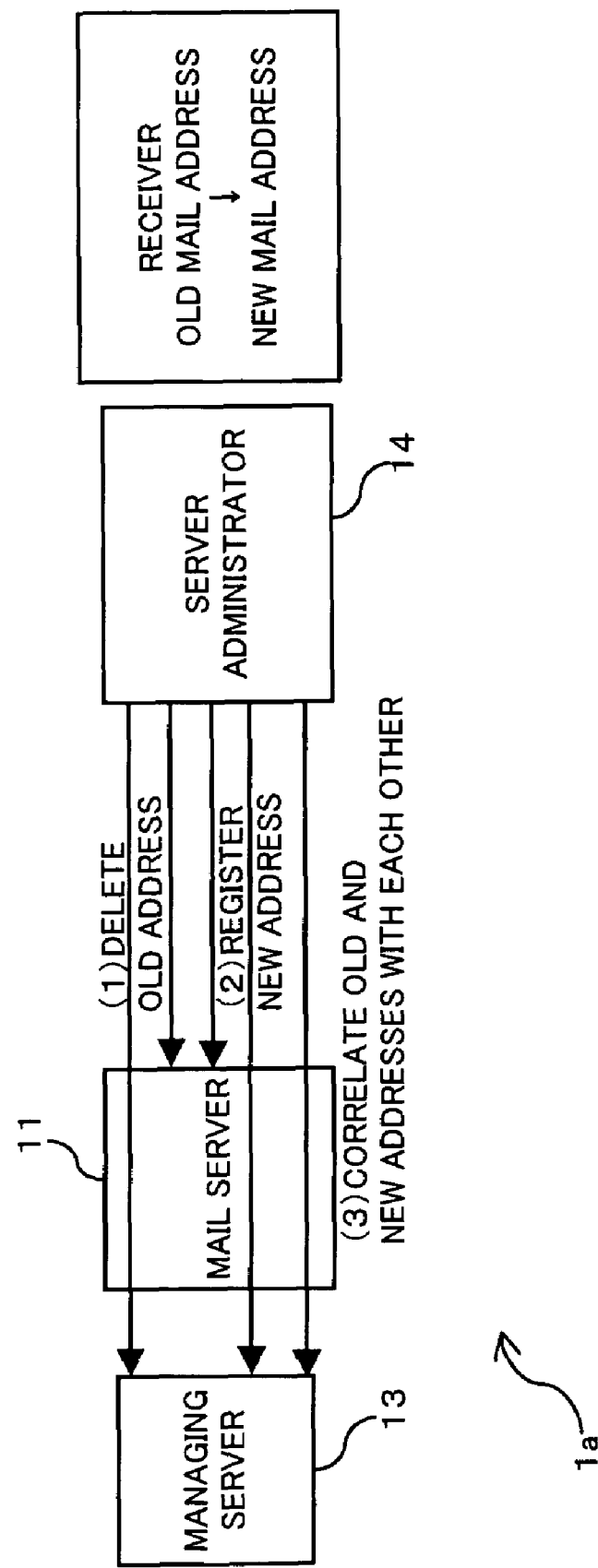
FIG. 11 illustrates a first modification of the mail system of the first embodiment.

In the mail system of the first embodiment, various modifications may be made to the managing server 13 and the mail server 11, being exemplified by the following:

(1) First Modification of Mail System of First embodiment:

FIG. 11 illustrates a first modification of the mail system of the first embodiment. Arrows each labeled with a parenthesized number mean the matters "a certain process is carried out" or "a certain process occurs", and the numbers in brackets designate the sequence in which these matters occur. Also in the following description, an arrow labeled with a number in brackets indicates the same meaning.

Parts or elements similar or substantially similar to those mentioned above in connection with the first embodiment are designated by the same reference numbers, so their description is omitted here.

The mail system 1a of the first modification includes a single server 11 and a single managing server 13. If a destination mail address being managed by the mail server 11 has been updated, the managing server 13 manages the old mail address and the new mail address in correlation with each other.

In the thus constructed mail system 1a, to register the updating of the mail address, the server administrator 14 firstly deletes the old mail address in the mail server 11 (arrow (1)) and then register the new mail address (arrow (2)), whereupon the server administrator 14 registers the old mail address and the new mail address in the mail address management table 30 (FIG. 4) of the managing server 13 in correlation with each other (arrow (3)).

(2) Second Modification of Mail System of

Figure 12:
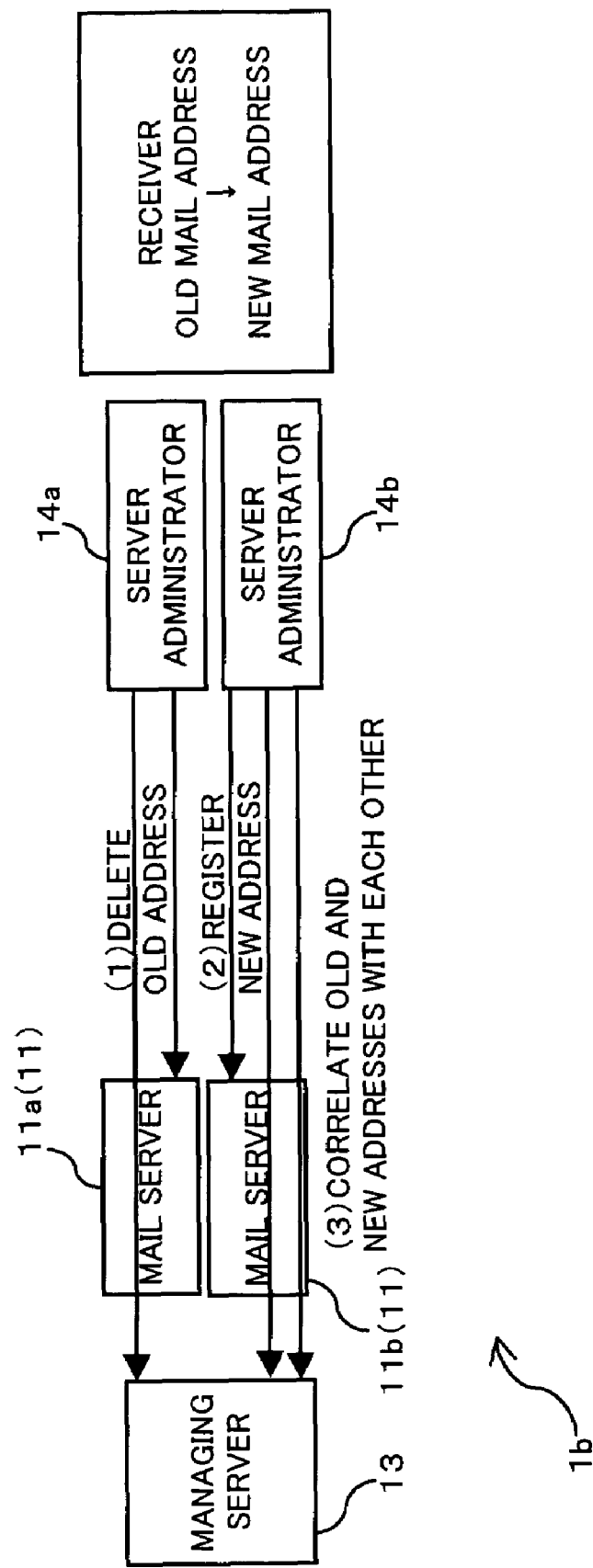
FIGS. 12 and 13 illustrate a second modification of the mail system of the first embodiment.
Figure 13:
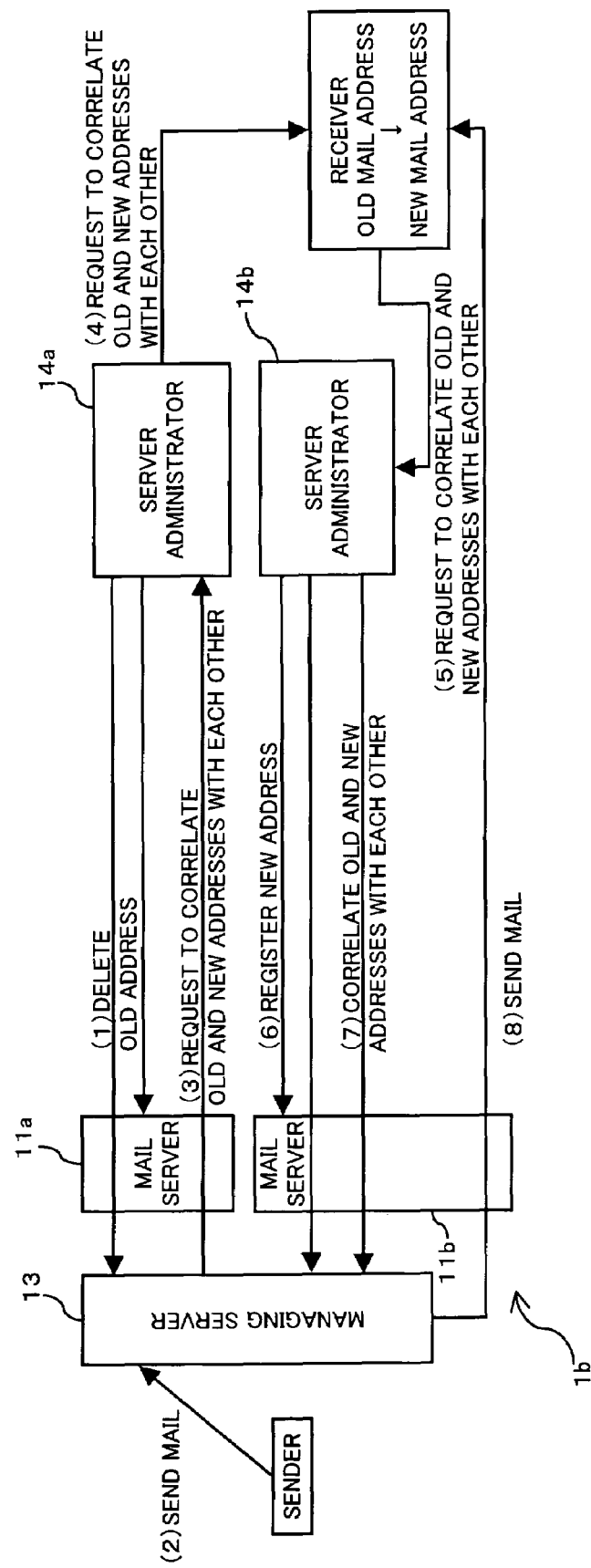

First Embodiment:

FIGS. 12 and 13 illustrate a second modification of the mail system of the first embodiment. The mail system 1b of the second modification includes two mail servers 11a, 11b and a single managing server 13. If destination mail addresses being respectively managed by the mail servers 11a, 11b have been updated, the managing server 13 manages the olds mail addresses and new mail addresses in correlation with one another.

Parts or elements similar to or substantially similar to those mentioned above in connection with the first embodiment and the first modification are designated by the same reference numbers, so their description is omitted here.

The procedure in which the old mail address being mail server 11a is updated into a new mail address to be managed by and registered in the mail server 11*b* according to the thus constructed mail system 1*b* will now described with reference to FIG. 12.

As shown in FIG. 12, firstly the server administrator 14*a* of the mail server 11*a* deletes the old mail address in the mail server 11*a* and registers the old mail address in the mail address management table 30 (FIG. 4) of the managing server 13 (arrow labeled with (1)).

Then the server administrator 14*b* of the mail server 11*b* registers the new mail address in the mail server 11*b* (arrow labeled with (2)) and also registers the old mail address and the new mail address in the mail address management table 30 of the managing server 13 (arrow labeled with (3)).

The procedure in which an e-mail has been sent to the old mail address after the old mail address was deleted and before the new mail address is registered, will now be described with reference to FIG. 13.

As shown in FIG. 13, if an e-mail has been sent to the old mail address (arrow labeled with (2)) after the server administrator 14*a* deleted the old address in the mail server 11*a* and registered the old mail address in the mail address management table 30 of the managing server 13 (arrow labeled with (1)), the managing server 13 stores the e-mail in the hard disk or the like and requests the server administrator 14*a* to register a new mail address corresponding to the old mail address in the mail address management table (arrow labeled with (3)).

At that time, the managing server 13 may notifies the mail source that the e-mail is held in the managing server 13 as the mail address of the destination has been updated and will be sent to a new mail address of the destination when such new mail address is registered within a predetermined time.

The server administrator 14*a* requests the destination user for correlation between the new mail address and the old mail address (arrow labeled with (4)), and the destination user makes an application to the server administrator 14*b* for registration of the new and old mail addresses in correlation with each other in response to the request from the server administrator 14*a* (arrow labeled with (5)). Upon receipt of this application, the server administrator 14*b* registers the new mail address of the destination in the mail server 11*b* (arrow labeled with (6)) and also registers the new mail address in correlation with the already registered old mail address in the mail address management table 30 of the managing server 13 (arrow labeled with (7)).

Upon registration of the new mail address in the managing server 13, the managing server 13 sends the e-mail to the mail server 11*b* and then the mail server 11*b* sends the e-mail to the new mail address of the destination. Therefore, even if the mail address of a particular destination has been updated, it is possible to send an e-mail exactly to the particular destination at a new mail address corresponding to the old mail address.

(3) Third Modification of Mail System of

First Embodiment

Figure 14:
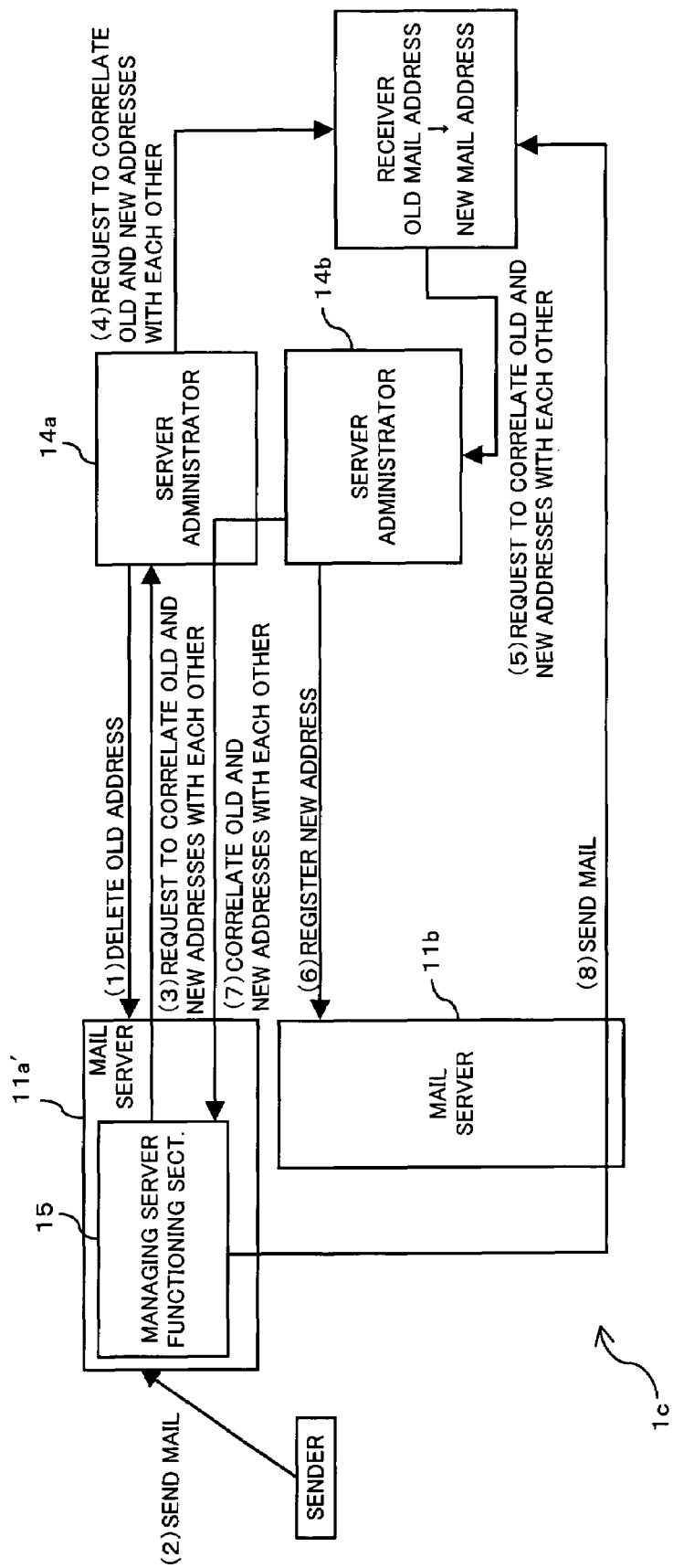
FIG. 14 illustrates a third modification of the mail system of the first embodiment.

FIG. 14 is a diagram illustrating a third modification of the mail system of the first embodiment. The mail system 1*c* of the third modification includes two mail servers 11*a'*, 11*b*, the mail server 11*a'* having a managing server functioning section 15 whose function is identical with that of the above-mentioned managing server 13.

Parts or elements similar to or substantially similar to those mentioned above in connection the first embodiment and the first and second modifications, so their description is omitted here.

The managing server functioning section 15 is equipped with a mail address management table 30 (FIG. 4) for managing the old and new addresses, which are respectively managed by the mail servers 11*a'*, 11*b*, in correlation with each other.

The server administrators 14*a*, 14*b* respectively manages the mail servers 11*a'*, 11*b* to register a new mail address in the mail server 11*a'*, 11*b* when the mail address of a particular destination has been updated.

The procedure in which an e-mail has been sent to a destination at the old mail address after the old mail address was deleted and before the new mail address is registered, will now be described.

As shown in FIG. 14, the server administrator 14*a* deletes the old mail address in the mail server 11*a'* and registers the old address in a mail address management table 30 (FIG. 4) of the managing server functioning section 15 (arrow labeled with (1)). Then, if an e-mail has been sent to the old address before a new mail address corresponding to the old mail address is registered in the mail address management table 30 (arrow labeled with (2)), the managing server functioning section 15 temporarily stores the e-mail in a hard disk or the like of the managing server functioning section 15 and requests the server administrator 14*a* for registration of the new mail address in the mail address management table 30 (arrow labeled with (3)).

At that time, the managing server functioning section 15 may notify the mail source that the e-mail is held by the managing server functioning 15 as the mail address of the destination has been updated and will be sent to the destination at a new address when the new mail address is registered within a predetermined time.

The server administrator 14*a* requests the destination for correlation between the old and new mail addresses (arrow labeled with (4)), and the destination makes an application to the server administrator 14*b* for registration of the new and old mail addresses in correlation with each other (arrow labeled with (5)). Upon receipt of this application, the server administrator 14*b* registers the new mail address in the mail server 11*b* (arrow labeled with (6)) and also registers the new mail address in correlation with the already registered old address in the mail address management table 30 of the managing server functioning section 15 via the server administrator 14*a* (arrow labeled with (7)).

Upon registration of the new mail address by itself, the managing server functioning section 15 sends the e-mail to the mail server 11*b* to which the destination belongs, and then the mail server 11*b* sends the e-mail to the destination at the new mail address (arrow labeled with (8)).

Therefore, even if the mail address of a particular destination has been updated, an e-mail can be sent from the mail source to the destination at a new mail address. Further, at that time, though the mail source is not aware that the mail address of the destination has been updated, it is possible to send the e-mail exactly to the new mail address.

Figure 15:
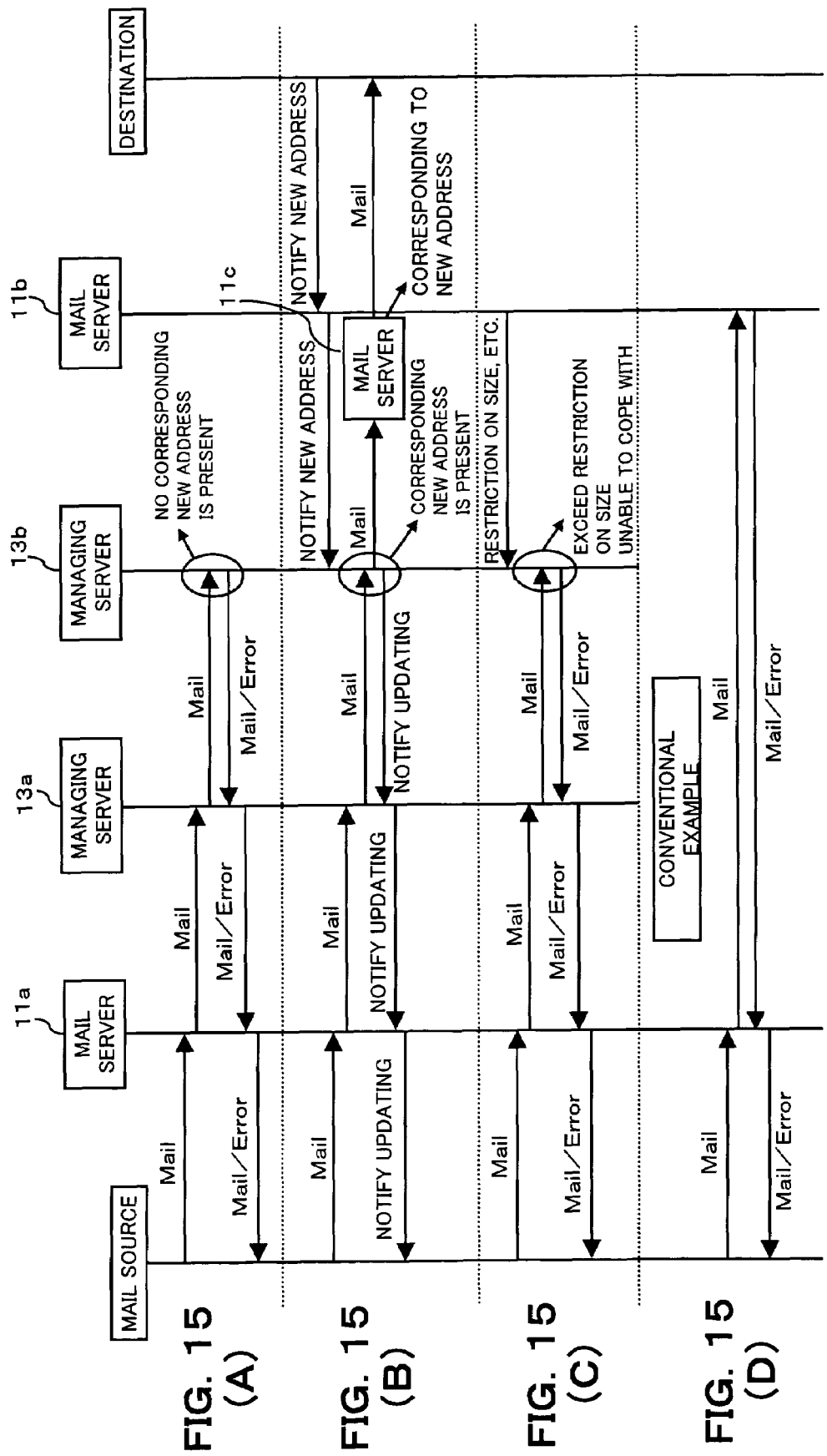
FIG. 15, (A) through (D), is a comparison diagram illustrating how to notify an error message to a mail source in the mail system of the first embodiment in comparison with the conventional mail system.

(4) Explanation of Error Message:

FIGS. 15(A) through 15(D) are diagrams explaining an error message, which is to be notified to the mail source in the mail system of the first embodiment, in comparison with the conventional mail system. FIGS. 15(A) through 15(C) show the manner in which an e-mail flows in the mail system of the first embodiment, and FIG. 15(D) shows the manner in which an e-mail flows in the conventional mail system.

The mail system of FIGS. 15(A)–15(C) includes two mail servers 11*a*, 11*b* and two managing servers 13*a*, 13*b*. Whereas the conventional mail system of FIG. 15(D), includes two mail servers 11*a*, 11*b*.

In the conventional mail system, an e-mail (Mail) sent from the mail source is sent from the mail server 11a to the mail server 11b, and the mail address of the destination has been updated, the mail server 11b sends to the mail source via the mail server 11a the e-mail and an error message (Mail/Error) indicating that the destination is unknown (FIG. 15(D)).

In the mail system of the first embodiment, an e-mail (Mail) from the mail source is sent to the mail server 11a, the managing servers 13a, 13b and the mail server 11b in this sequence. If the new mail address of the destination is not registered in either the managing server 13a the managing server 13b, the managing server 13b sends to the mail source via the managing server 13a and the mail server 11a the e-mail and an error message (Mail/Error) "mail is returned because address ***@*.*. was invalidated and a new mail address is unknown" indicating that the new mail address is not registered (FIG. 15(A)).

The managing server 13b may temporarily store the e-mail for a predetermined time instead of sending the e-mail and the error message to the mail source, and may send to the mail source another message "holding the e-mail for XX days for correlation with a new mail address because the mail address ***@*.*. is invalidated" to wait for a predetermined time for registration of a new mail address.

Further, if the new mail address of the destination has been notified from the destination to the mail server 11b and the managing server 13b and has been registered in the managing server 13b, the e-mail sent from the mail source to the mail server 11a and the managing server 13a, 13b in this sequence is then sent from the managing server 13b to the mail server 11c, which manages the new mail address, whereupon the e-mail is sent from the mail server 11c to the new mail address.

Then the managing server 13b sends to the mail source via the managing server 13a and the mail server 11a a notification that the mail address of the destination has been updated (FIG. 15(B)).

If the managing server 13b cannot send the e-mail because there is a limit in e-mail data size sendable/receivable in the mail server 11b managing the mail address of the destination, the managing server 13b notifies the mail source of an error message "the e-mail addressed to ***@*.*. has been rejected to receive because of the size limit" (FIG. 15(C)).

(C) Second Embodiment

As shown in FIG. 2, a mail system 31 according to a second embodiment of the present invention, like the mail systems 1a through 1c of the modifications of the first embodiment, also sends an e-mail from the mail source to the mail address of the destination, and is constructed by adding a managing server 33 to the conventional mail system 1' mentioned above in connection with FIG. 24.

Figure 16:
FIG. 16 illustrates a system environment information table in the mail system of the second embodiment.

FIG. 16 is a diagram illustrating a system environment information table in the mail system 31 of the second embodiment. The managing server 33, as shown in FIG. 16, temporarily stores in a hard disk 113 (FIG. 3) the system environment information table 40 for registering the mail addresses of destinations and system environments of the client 10, which is to be used by the destination for receiving the e-mail, in correlation with each other.

The system environment information of this system environment information table 40 is exemplified by the type of an OS (Operation System) or a mailer, the capacity of a receivable e-mail, the information as to whether or not an extracting (extending to the original data) tool is installed, the information as to whether or not the divided file can be combined together, as to whether or not the ciphered file can be deciphered, and the type of application installed for these processes. Thereby the managing server 33 functions as a system environment storage section 26 (FIG. 1) to store the system environment information of the destinations.

Figure 17:
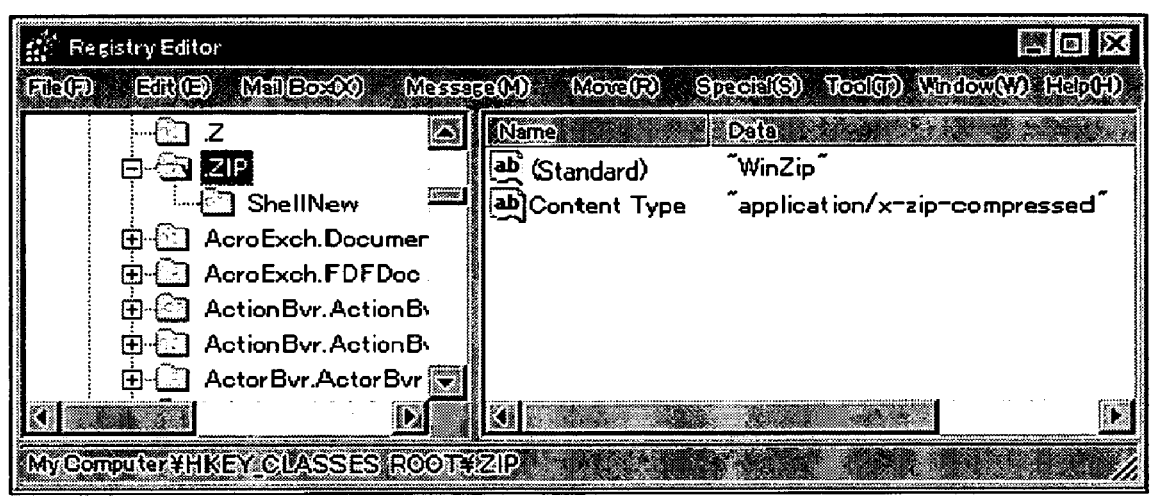
FIG. 17 shows registry information of a client in the mail system of the second embodiment.

FIG. 17 shows registry information of the individual client in the mail system 31 of the second embodiment. The managing server 33 obtains the registry information of the client 10, as shown in FIG. 17, to create the system environment information table 40.

Alternatively, the managing server 33 may create a system environment table by requesting the client 10 for the system environment information when sending an e-mail to the client 10, or may previously set a system environment information collecting program in the individual client 10 to periodically collect the system environment information collected by this program.

Further, if the system environment information has been updated in the individual client 10, that client 10 notifies the managing server 33 of this updating.

Generally, as the mailer, one type is known which previously registers an application for extending the file attached to an e-mail and can open the attached file automatically or manually upon receipt of the e-mail to which the file is attached.

In registration of the application, the mailer stores the application in a particular file on many occasions so that, in the mail system of the second embodiment, the client 10 notifies the managing server 33 that the system environment of the client 10 has been updated when this file has been updated.

In this case, if it is not connected to the network 12, the client 10 waits for that notification until it is connected to the network 12.

Upon receipt of the notification that the system environment information has been updated, the managing server 33 updates the system environment information table 40 about the concerned mail address in accordance with the notified system environment information.

Further, upon receipt of the e-mail, the managing server 33 extracts the mail address of the destination and consults with the system environment information table 40 to examine the system environment information of the client 10, which is to be used in receiving the e-mail of the mail address. And the managing server 33 functions as the mail processing section 27 (FIG. 1) for processing e-mail data, which is contained in the e-mail from the mail source, into a form receivable by the destination based the system environment information.

Specifically, the managing server 33 has a data compressing application which, if the size of the e-mail data is larger than that of e-mail data receivable by the destination and the mail server 11, compresses the e-mail data into a size receivable by the destination and the mail server 11 in a form extendable by the destination (such as zip, 11a, self-extending way).

The managing server 33 has also a data extending application which, if the sent e-mail is compressed, and if the destination has no data extending application or the e-mail data is compressed in a form non-extendable by the destination, extends the e-mail data or encodes the e-mail data into a form extendable by the destination so that the resulting e-mail is ready to be sent to the mail server 11.

Further, the managing server 33 has a data dividing application which, if the size of the sent e-mail data is larger than that of e-mail data receivable by the destination and the mail server 11 and if the e-mail data cannot be compressed into a data size receivable by the destination using the data compressing application, divides the e-mail data into a plurality of pieces of e-mail data of a data size receivable by the destination and the mail server 11. When dividing the e-mail data, the managing server 33 compresses the e-mail data in a form combinable by the destination.

Furthermore, the managing server 33 has a data combining application which, if e-mail data of the sent e-mail has been divided into a plurality of pieces of e-mail data and if the destination has no data combining application or the e-mail data has been divided in a form non-combinable by the destination, combines the e-mail data pieces into the original e-mail data to send the combined e-mail data to the mail server 11, or redivides the e-mail data pieces into an alternative form combinable by the destination to send the resulting e-mail data pieces to the mail server 11.

In addition, the managing server 33 has a data ciphering application for ciphering the sent e-mail data into a form decipherable by the destination.

Further, the managing server 33 has a data deciphering application which, if the sent e-mail has been ciphered and if the destination has no deciphering application or the e-mail data has been ciphered in a form non-decipherable by the destination, ciphers in a form decipherable by the destination to send the thus ciphered e-mail to the mail server 11.

Then the managing server 33 sends the processed e-mail to the mail server 11, which manages the mail address of the destination, and the mail server 11 functions as the mail sending section 22 (FIG. 1) for sending the processed e-mail to the destination.

Figure 18:
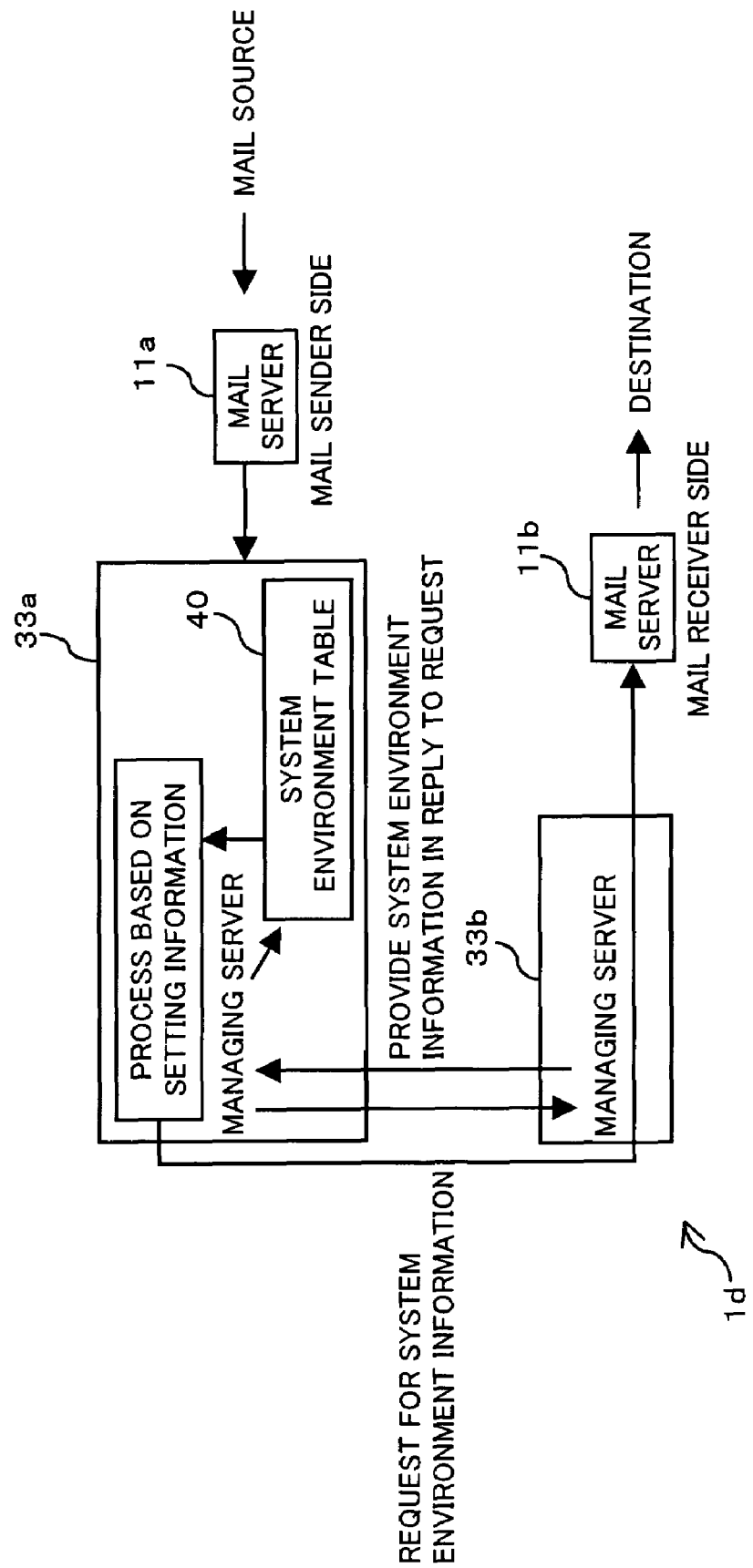
FIG. 18 illustrates the procedure of the managing server in the mail system of the second embodiment.

The procedure of the managing server in the mail system of the second embodiment will now be described with reference to FIG. 18. The mail system 1*d* of FIG. 18 includes two mail servers 11*a*, 11*b* and two managing servers 33*a*, 33*b*.

Assume that an e-mail is sent from the mail source, whose mail address is managed by the mail server 11*a*, to the destination, whose mail address is managed by the mail server 11*b*. First of all, the e-mail sent from the mail source is sent to the managing server 33*a* via the mail server 11*a*. Then the managing server 33*a* examines the system environment information of the client 10 corresponding to the mail address by consulting with the system environment information table 40.

If the system environment information corresponding to the mail address of the destination is not registered in the system environment information table 40 of the managing server 33*a*, the managing server 33*a* request the managing server 33*b* for sending the system environment information.

In response to this request, the managing server 33*b* collects the system environment information about the mail server 11*b* and the client 10 and send the collected system environment information to the managing server 33*a*. Then the managing server 33*a* registers the received system environment information in the system environment information table 40 in correlation with the mail address.

The managing server 33*a* processes the e-mail data of the received e-mail into a form received by the destination based on the system environment information table 40 and then send the resulting e-mail to the mail server 11*b* via the managing server 33*b*. Then the mail server 11*b* sends the e-mail to the destination client 10.

In the second embodiment, the sending-side managing server 33*a* has the system environment table 40 and processes the e-mail based on the information registered in this system environment information table 40. Alternatively, the receiving-side managing server 33*b* may have the system environment information table 40, and the managing server 11*b* may process the e-mail based on the information registered in this system environment information table 40. Various other changes or modifications may be suggested without departing from the gist of the invention.

Figure 19:
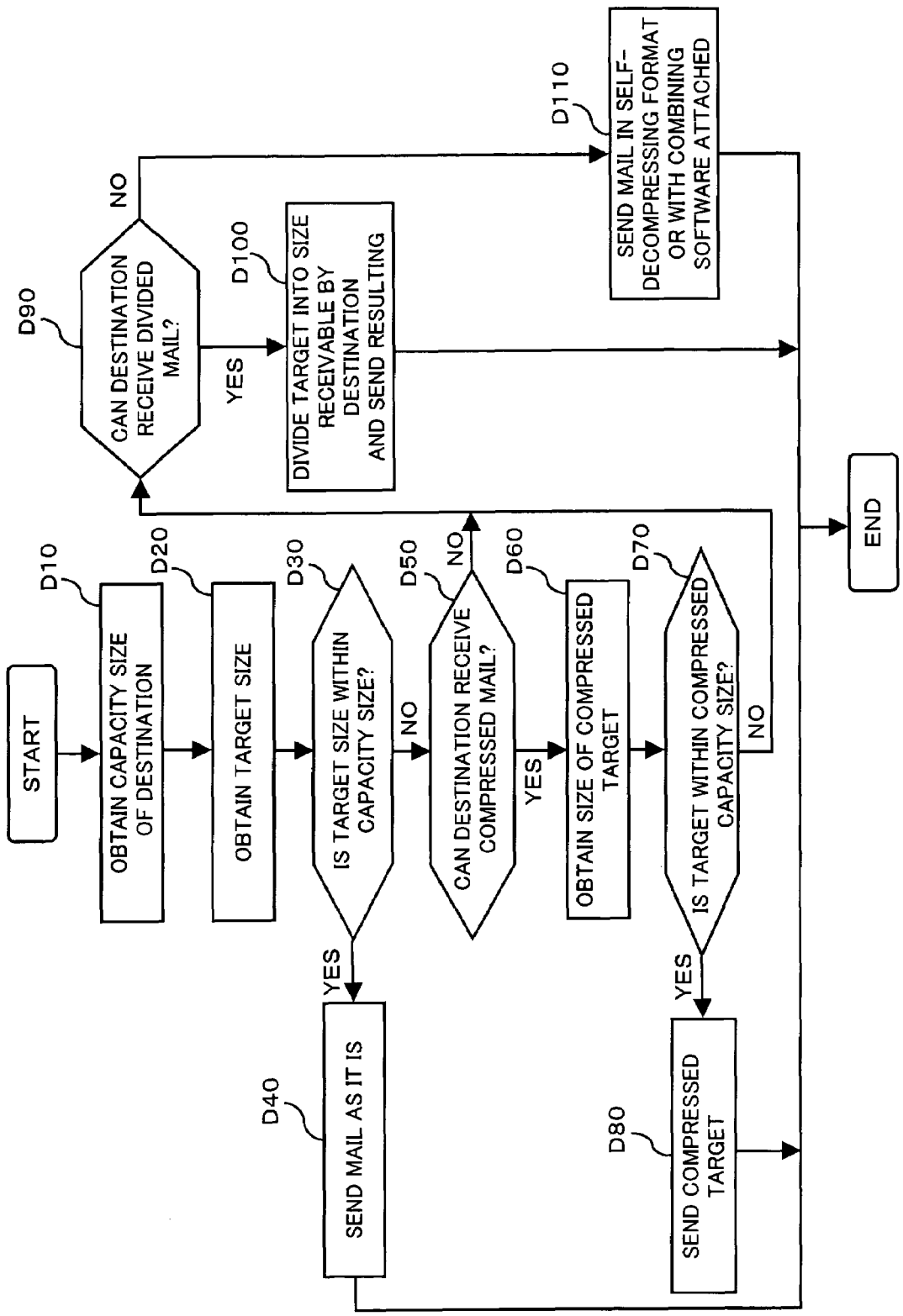
FIG. 19 is a flow diagram illustrating the procedure of the managing server as a mail processing section in the mail system of the second embodiment.

The procedure of the managing server as the mail processing section in the mail system of the second embodiment will now be described with reference to the flow diagram (steps D10 through D110) of FIG. 19.

Upon receipt of an e-mail, the managing server 33 firstly consults with the system environment information table 40 and examines the system environment information of the destination corresponding to the mail address to obtain information about the data size receivable by the destination as an e-mail (step D10). Then the managing server 33 examines the data size of the sent e-mail (target) (step D20) and also discriminates whether or not the data size of the target is equal to or smaller than the data size receivable by the destination (step D30).

If the data size of the target is equal to or smaller than the data size receivable by the destination (YES route of step D30), the managing server 33 sends the e-mail to the mail server 11 corresponding to the mail address without processing the e-mail.

Otherwise if the data size of the target is larger than the data size receivable by the destination (NO route of step D30), the managing server 33 consults with the system environment information table 40 to examine whether or not the compressed e-mail can be extended by the destination (step D50).

If the compressed e-mail data can be extended by the destination (YES route of step D50), the managing server 33 then examines the data size of the e-mail data as compressed (step D60) and discriminates whether or not the compressed data size of the target is equal to or smaller than the data size receivable by the destination (step D70). If the compressed data size of the target is equal to or smaller than the data size receivable by the destination (YES route of step D70), the managing server 33 sends the compressed e-mail to the corresponding mail server 11 (step D80).

Otherwise if the compressed e-mail cannot be extended by the destination (NO route of step D50), or if the compressed data size of the target is larger than the data size receivable by the destination (NO route of step D70), the managing server 33 consults with the system environment information table 40 to examine whether or not the divided e-mail can be combined into the original e-mail by the destination (step D90).

If the divided e-mail data cannot be combined into the original e-mail data by the destination (NO route of step D90), the managing server 33 compresses the e-mail data in a self-extending form, or divides the e-mail data into a plurality of e-mail data pieces and attaches a data combining program to the divided e-mail data pieces, whereupon the managing server 33 sends the corresponding to the mail server 11 (step D110).

Otherwise if the divided e-mail data can be combined by the destination (YES route of step D90) the managing server 33 divides a plurality of e-mail data pieces whose data size is equal to or smaller than the data size receivable by the destination and sends the e-mail data pieces to the corresponding mail server 11 (step D100).

In the second embodiment, if the e-mail data cannot be compressed or does not suffice after compression of the e-mail data has been tried, the e-mail data is divided. Alternatively, division of the e-mail data may be adopted in precedence over the compression and then compress the divided e-mail data.

If the divided e-mail data is compressed, whether or not the divided e-mail data should be compressed may be decided by comparing the data size when the e-mail data is only divided is made with the data size when the divided e-mail data and then discriminating whether or not the difference of these data sizes is equal to or larger than a predetermined value (e.g., 1024 KB). In this case, it is desirable to compress the e-mail data only when the data size difference is equal to or larger than the predetermined value; this predetermined value may be set for every domain or for every client.

Further, in the second embodiment, the managing server 33 has the system environment information table 40. Alternatively mail server 11 may have the system environment information table 40. Various other changes or modifications may be suggested without departing from the gist of the invention.

The procedure in which an e-mail is sent to the old mail address in the mail system of the second embodiment after the old mail address has been deleted and before a new mail address is registered, will now be described with reference to FIG. 20.

Figure 20:
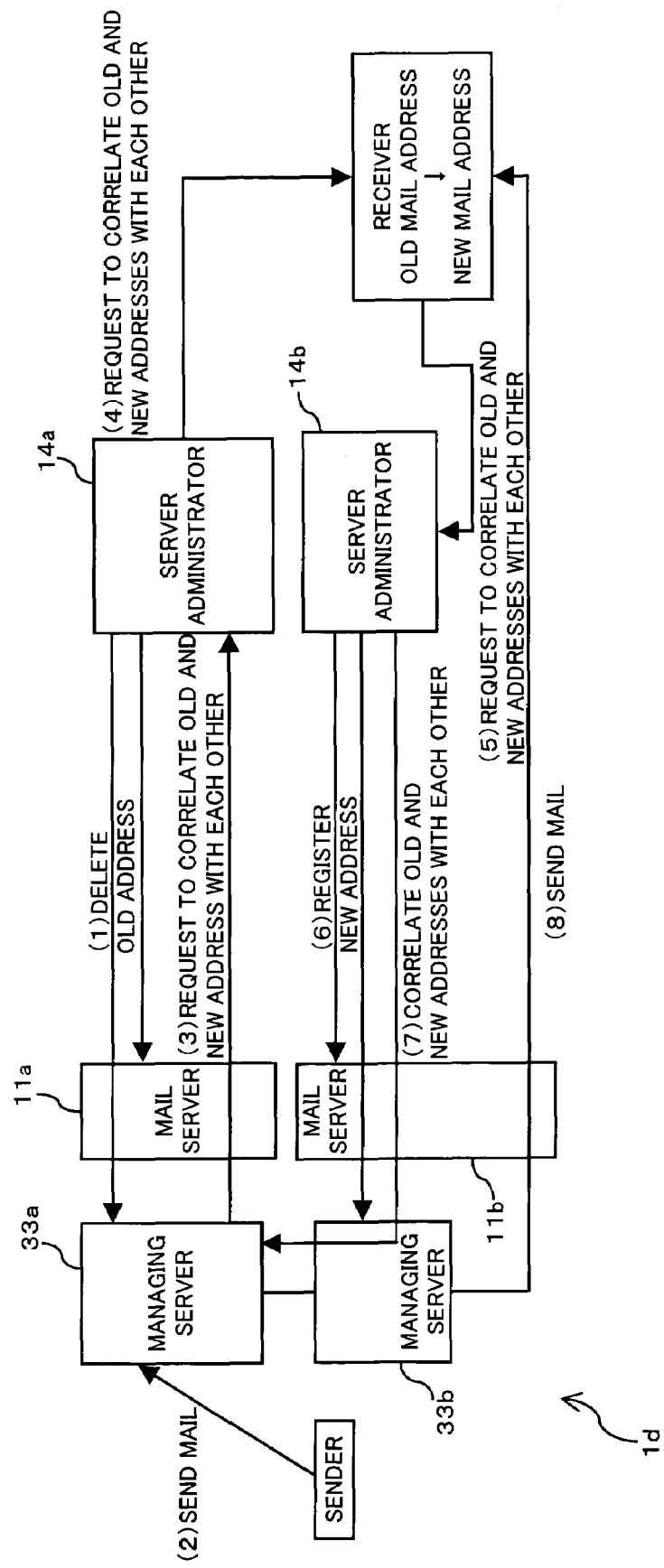
FIG. 20 illustrates the procedure when an e-mail is sent after the old mail address has been deleted and before a new address is registered for substitution for the old mail address in the mail system of the second embodiment.

As shown in FIG. 20, the server administrator 14a deletes the old mail address in the mail server 11a and registers the old mail address in the mail address management table 30 (FIG. 4) of the managing server 33a (arrow labeled with (1)).

Then, if an e-mail has been sent to the old mail address before a new mail address corresponding to the old mail address is registered in the mail address management table 30 (arrow labeled with (2)), the managing server 33a requests the server administrator 14a to register the new mail address corresponding to the old mail address in the mail address management table 30 (arrow labeled with (3)). Further, the managing server 33a temporarily stores the sent e-mail in the hard disk or the like.

During that time, the managing server 33a may notify the mail source that the e-mail is temporarily held because the mail address of the destination has been updated and will be sent when a new address of the destination is registered within a predetermined time.

The server administrator 14a requests the destination user to correlate the new mail address with the old mail address (arrow labeled with (4)), and the destination user makes an application to the server administrator 14b to inform of the correlation between the old and new mail addresses in response to the request from the server administrator 14a (arrow labeled with (5)). Upon receipt of this application, the server administrator 14b registers the new mail address of the destination in the mail server 11b (arrow labeled with (6)) and also registers the new mail address corresponding to the already registered old mail address in the mail address management table 30 of the managing server 33a (arrow labeled with (7)).

Upon registration of the new mail address in it, the managing server 33a sends the e-mail to the mail server 11b, to which the destination belongs, via the managing server 33b (arrow labeled with (8)).

At that time, the managing server 33b extracts the mail address of the e-mail and processes the e-mail data into a form receivable by the destination consulting with the system environment information table 40, whereupon the managing server 33b sends the e-mail to the mail server 11b.

Subsequently, when the mail server 11b sends the e-mail to the new mail address of the destination, the e-mail can be sent from the mail source to the new mail address of the destination even if there is a limit on system in the destination client 10 and the mail server 11b. At that time, Even when the mail source is not aware of a limit on the system of the destination, it is possible to send the e-mail exactly to the destination.

Figure 21:
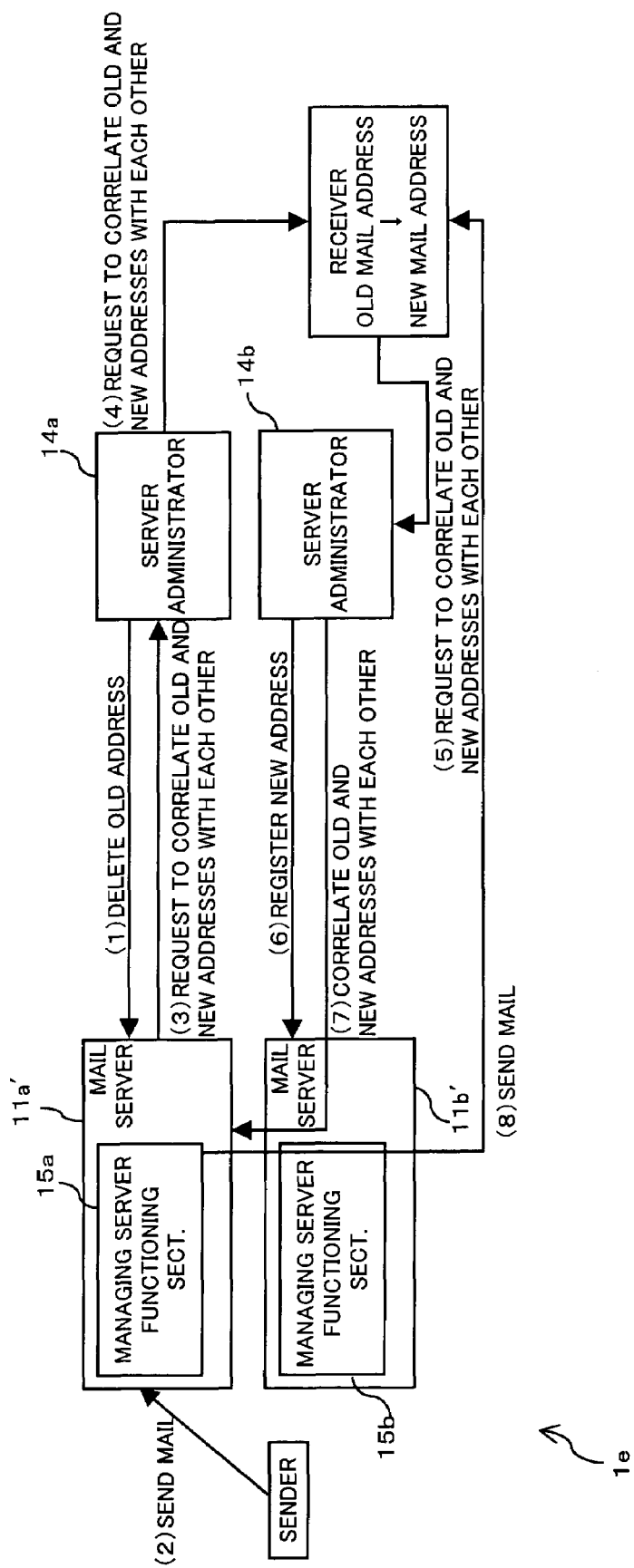
FIG. 21 illustrates a modification of the mail system of the second embodiment.

FIG. 21 is a diagram illustrating a modification of the mail system of the second embodiment. The mail system 1e of the modification of the second embodiment includes two mail servers 11a', 11b'.

The mail server 11a' has a managing server functioning section 15a which functions as the above-mentioned managing server 33. Likewise the mail server 11b' has a managing server functioning section 15b which functions as the above-mentioned managing server 33.

Parts or elements similar to or substantially similar to those mentioned above in connection with the first and second embodiments and the first through third modifications of the first embodiments are designated by the same reference numbers, so their description is omitted here.

The managing server functioning section 15a has a mail address management table 30 (FIG. 4) which manages the first and second mail addresses in correlation with each other if the mail address being managed by the mail servers 11a', 11b' have been updated.

The managing server functioning section 15b has a system environment information table 40 (FIG. 16) in which the system environment information of the client 10, which the destination uses in receiving the e-mail, in correlation with the mail address being managed by the mail server 11b is registered.

The server administrators 14a, 14b respectively manage the mail servers 11a', 11b' to register the updating of the mail address, if occurred, in the mail servers 11a', 11b'.

The procedure of the mail system 1d in which an e-mail has been sent to the old mail address after the old mail address was deleted and before a new mail address is registered, will now be described.

As shown in FIG. 21, the server administrator 14a deletes the old mail address in the mail server 11a' and registers the old mail address in the mail address management table 30 of the managing server functioning section 15a (arrow labeled with (1)).

Subsequently, if the e-mail has been sent to the old mail address before a new mail address corresponding to the old mail address is registered (arrow labeled with (2)), the managing server functioning section 15a requests the server administrator 14a to register the new mail address corresponding to the old mail address in the mail address management table 30 (arrow labeled with (3)). Further, the managing server functioning section 15a temporarily holds the sent e-mail in the hard disk or the like.

At that time, the managing server functioning section 15a may notify the mail source that the e-mail is temporarily held for a predetermined time because the mail address of the destination has been updated and will be sent to the destination when a new mail address of the destination is registered within a predetermined time.

The server administrator 14a requests the destination to correlate the old and new mail addresses with each other (arrow labeled with (4)), the destination makes an application to the server administrator 14b to inform of correlation between the old and new mail addresses (arrow labeled with (5)). Then the server administrator 14b registers the new mail address in the mail server 11b (arrow labeled with (6)) and also registers the old mail address in correlation with the already registered old mail address in the mail address management table 30 of the managing server functioning section 15a via the server administrator 14a (arrow labeled with (7)).

Upon registration of the new mail address in the managing server functioning section 15a, the mail server 11a sends the e-mail to the mail server 11b (arrow labeled with (8)).

In the mail server 11b, the managing server functioning section 15b extracts the mail address of the e-mail and processes the e-mail data into a form receivable by the destination based on the system environment information table 40.

Subsequently, when the mail server 11b sends the e-mail to the new mail address of the destination, the e-mail from the mail source can be sent to the new mail address of the destination even if there is a limit on the system in the destination client 10 and the mail server 11b. At that time, even if the mail source is not aware of the limit on the system of the destination, it is possible to send the e-mail exactly to the destination.

(D) Third Embodiment

Figure 22:
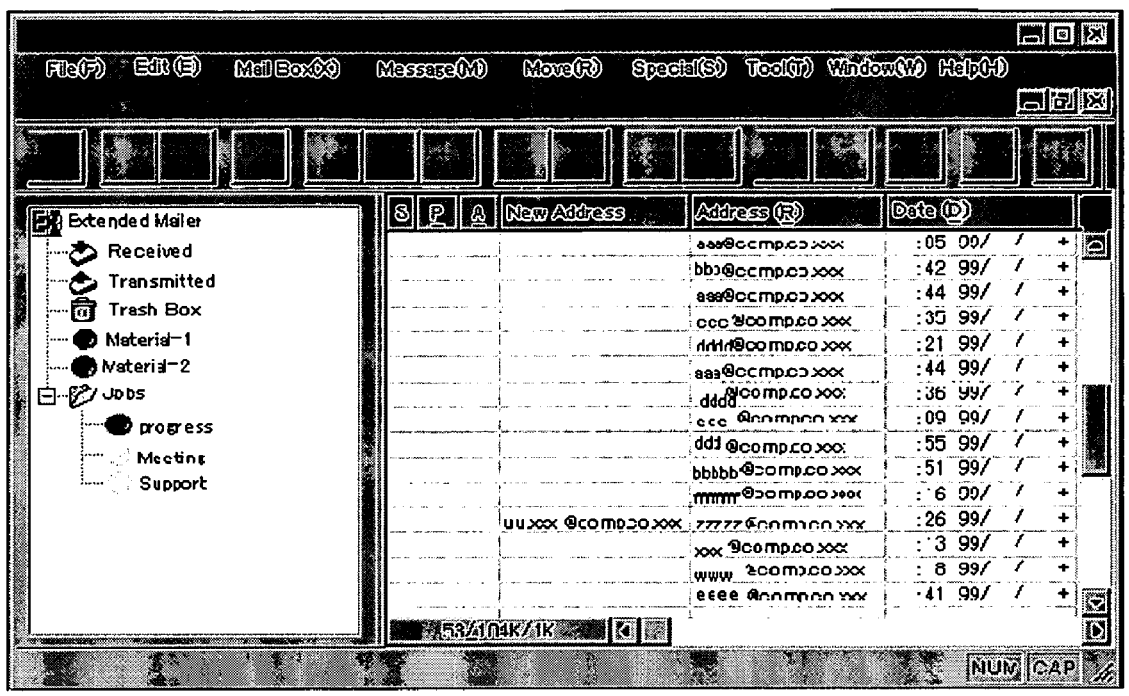
FIG. 22 illustrates a mail system according to a third embodiment of the present invention.

FIG. 22 illustrates a mail system according to a third embodiment of the present invention, showing a typical display of an application which manages sending/receiving of an e-mail in the managing servers 13 (13a, 13b), 33 (33a, 33b) of the mail systems 1, 31, 1a through 1e according to the first and second embodiments and the modifications thereof.

In the mail system of the third embodiment, as shown in FIG. 22, the managing server (registration time information recording section) 13, 33 has an application managing the mail addresses of all e-mails, which were sent from the mail source, and dates of sending of the e-mails in correlation with one another. If the mail address of a particular destination has been updated, a time stamp (registration time information) specifying the time when the new mail address was registered is registered in correlation with the old and new mail addresses.

Namely, by executing this application, the individual managing server 13, 33 functions as the registration time information recording section 28 (FIG. 1) for recording a time stamp specifying the time when the mail address of a destination was registered in correlation with the mail address in the e-mail address book.

Further, the individual managing server 13, 33 rewrites the mail address of a destination in the e-mail address book of the mailer. Particularly upon receipt of a notification that the mail address of a destination has been updated, the individual managing server 13, 33 functions as the mail address rewriting section 24 (FIG. 1) for rewriting the mail address, which is registered in the e-mail address book of the mailer, into a new mail address.

In the meantime, in the client (mail sending terminal) 10, it is possible to consult with the time stamp of a new mail address being managed by the managing servers 13, 33. Upon receipt of a notification that the mail address of a destination has been updated, the client 10 consults the time stamp of the mail address and then instructs the managing server 13, 33 to rewrite the mail address of the destination in the e-mail address book of the mailer in accordance with the time stamp.

Namely, the client 10 functions as the mail address rewrite instructing section 34 (FIG. 1) for instructing the managing server 13, 33 to rewrite the mail address.

With this construction, upon receipt of a notification that the mail address of a destination has been updated, the mail source user can discriminate whether the mail address should be updated, by consulting with the time stamp. If the time stamp of the mail address of the destination is old, the client 10 judges that the mail address should be updated, and hence instructs the managing server 13, 33 to rewrite the mail address of the destination in the e-mail address book of the mailer.

Accordingly new mail addresses are automatically registered in the e-mail address book of the mailer, so an improved degree of reliability of the mail system can be achieved.

(E) Fourth Embodiment

Figure 23:
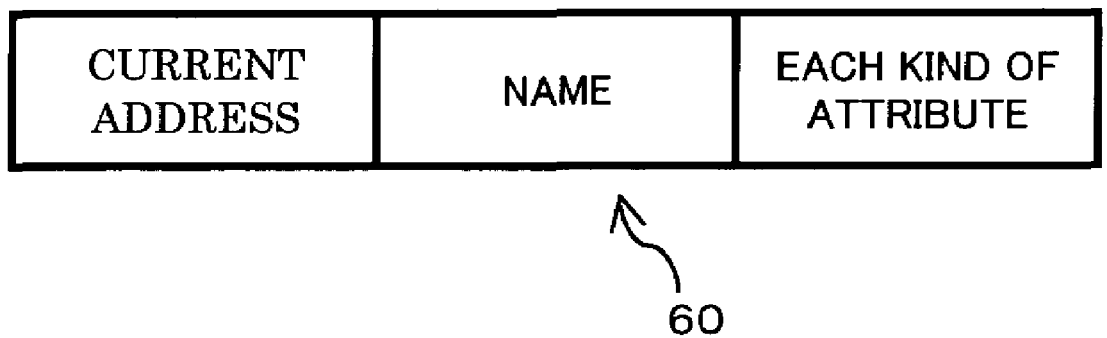
FIG. 23 shows mail address attribute information possessed by a managing server in a mail system according to a fourth embodiment of the present invention.

FIG. 23 shows a typical mail address attribute information a managing server has in a mail system of a fourth embodiment. The managing server in the mail system of the fourth embodiment has a mail address attribute information table 60 fragmentary shown in FIG. 23.

The mail address attribute information table 60 registers the mail addresses of destinations and the attribute information about the destinations; this attribute information is exemplified by department or section (of an organization, company, etc.) to which the destination is assigned, and employee information.

In the mailer of each client, this attribute information can be described in place of the mail address of the destination when an e-mail is created.

If the attribute information is described at the mail address of an e-mail, the managing server sends the e-mail to the mail address corresponding to the attribute information.

With this construction, in the mail system of the fourth embodiment, assuming that the mail source describes attribute information (e.g., department to which the destination is assigned is sales department), which specifies the destination, in stead of inputting the mail address of the destination when creating an e-mail and then sends the e-mail, the managing server rewrites the attribute information described in the e-mail into the mail address corresponding to the attribute information, consulting with the mail address attribute information table 60.

Subsequently, the managing server sends the e-mail to all the mail addresses (e.g., all the mail addresses of sales department to which the destination is assigned) corresponding to the attribute information.

Thus in the mail system of the fourth embodiment, as long as the attribute information is known, it is possible to send an e-mail to the mail address corresponding the attribute information even if the mail address of the destination is unknown. Particularly even if the mail address has been updated and a new mail address is unknown, it is possible to send an e-mail exactly to an intended destination using the attribute information instead.

Alternatively the mail address attribute information table 60 may be provided in any of the managing servers 13 (13a, 13b), 33 (33a, 33b) of each of the mail systems of the first through third embodiment. Various other changes or modifications may be suggested without departing from the gist of the invention.

(F) Alternative Modifications:

The present invention should by no means be limited to the illustrated examples, and various alternative changes or modifications may be suggested departing from the gist of the invention.

In the foregoing embodiments, the mail system comprises the managing servers 13, 33 and the clients 10. Alternatively the mail system may include only the managing servers or only the clients.

In another alternative, the managing server 13 (13a, 13b), 33 (33a, 33b) and/or the mail server 11 (11a, 11b) may have a filter function. This filter function returns or discards an e-mail without sending to the destination if the body or title of the sent e-mail or the mail address of the destination contains a particular key word such that the destination rejects to receive the e-mail.

Namely, with the mail system 1, 1a through 1e, 31 having this filter function, the destination can avoid receiving unnecessary e-mails.

By sending/receiving between the individual clients 10 an e-mail describing the old and new mail addresses in correlation with each other in a predetermined format and also executing the above-mentioned mail address updating script at the individual destination client 10, the individual destination client 10 can update the old address registered in the e-mail address book of the mailer into the new mail address described in the e-mail.

Accordingly the e-mail address books can be kept with the latest information mutually between the individual clients 10. Even if different mailers are used in the individual clients 10, it is possible to update the e-mail address book in conformity to the environment of the individual client 10 by the mail address updating script.

Further, the above-mentioned mail system may be applied to a mailing list so that, even if the mail address of a destination registered in a mailing list has been changed, an e-mail can be sent to the destination without deleting or reregistering the mail address in the mail list, thus facilitating maintenance and management of a meticulous mailing list and eliminating various possible problems due to occurrence of errors in the mailing list.

Furthermore, in the illustrated embodiments, the managing server 13 (13a, 13b), 33 (33a, 33b) has the mail address managing section (manager) 21, the mail sending section 22, the notifying section 23, the mail address rewriting section 24, the mail storage section 25, the system environment storage section 26, the mail processing section 27, the registration time information recording section 28. Alternatively the mail server 11 may have none of these functions, or these functions may be provided separately in the plural managing servers 13 or other parts.

Additionally, in the third embodiment, the managing server 13, 33 functions as the registration time information recording section 28 and the mail address rewriting section 24, while the client 10 functions as the mail address rewrite instructing section 34. Alternatively the client 10 may function as the registration time information recording section 28 and the mail address rewriting section 24, or the managing server 13, 33 may function as the mail address rewrite instructing section 34.

What is claimed is:

1. A mail system comprising:
    a source mail server managing a mail address of a mail source sending an e-mail;
    a destination mail server managing another mail address as a destination mail address of one or more destinations which receive the e-mail from said mail source through said source mail server and said destination mail server;
    a mail address manager managing respective destination mail addresses, said mail address manager being operative, in response to updating of the destination mail address of at least one destination, to register a new destination mail address in correlation with the old destination mail address;
    a mail storing section temporarily storing a particular e-mail, which is addressed to said old destination mail address, until said new destination mail address is registered by said mail address manager; and
    a mail sending section sending the particular e-mail to said new destination mail address when said new destination mail address is registered in said mail address manager,
    said mail address manager, said mail storing section and said mail sending section all of which are interconnected between said source mail server and said destination mail server.

2. A mail system according to claim 1, wherein said mail address manager is a mail server which receives an e-mail from said source mail source and sends the last-named e-mail to at least one destination mail address.

3. A mail system according to claim 2, wherein said mail address manager is a plurality of mail servers which manage the mail addresses of two or more destinations separately.

4. A mail system according to claim 1, further comprising:
    a notifying section notifying said mail source that the mail address of at least one destination has been updated.

5. A mail system according to claim 4, further comprising:
    a mail address rewriting section rewriting the mail address of at least one destination in an e-mail address book when said mail source is notified by said notifying section that the mail address of said at least one destination has been updated.

6. A mail system according to claim 1, wherein:
    said mail address manager registers the mail addresses of said destinations and attribute information respectively unique to said destinations in correlation with each other; and
    when sending an e-mail to the mail address of a particular destination, said mail source inputs said attribute information unique to said particular destination for substitution for the mail address of said particular destination so that the last-named e-mail is sent to said particular destination corresponding to said input attribute information.

7. A mail system according to claim 1, further comprising:
    a notifying section notifying said mail source of the new mail address of the destination.

8. A computer-readable recording medium in which a mail system program is recorded, said mail system program being adapted to render a computer to function as the following:
    a system environment information table create section creating a system environment information table, which is registering the mail addresses of destinations and system environment information of the destinations in correlation with each other, by obtaining said system environment information;
    a mail processing section which processes e-mail data, which is contained in an e-mail sent out from a mail source and addressed to a particular destination at a mail address thereof, into such a form receivable by said particular destination based on a system environment of said particular destination; and a mail sending section which sends the last-named e-mail, addressed to said particular destination and having the processed e-mail data, to said particular destination.

9. A computer-readable recording medium in which a mail system program is recorded, said mail system program being adapted to render a computer, which is interconnected between a source mail server managing a mail address of a mail source sending an e-mail and a destination mail server managing another mail address as a destination mail address of one or more destinations receiving the e-mail from said mail source through said source mail server and said destination mail server, to function as the following:

a mail address list for mailing list system in which a plurality of destination mail addresses the particular e-mail is sent in one lump are registered;

a mail address rewriting section which rewrites, upon receipt of a notice that the destination mail address of a particular destination registered in said mail address list for mailing list system has been updated, the old destination mail address of said particular destination into a new destination mail address; and a mail storing section temporarily storing a particular e-mail, which is addressed to said old destination mail address, until said new destination mail address is rewritten by said mail address rewriting section.

10. A mail system for sending an e-mail from a mail source to one or more destinations at their respective mail addresses, comprising:

a system environment storage section storing system environment information of the destinations;

a system environment information table create section creating a system environment information table, which registers the mail addresses of destinations and said system environment information in correlation with each other, by obtaining said system environment information;

a mail processing section processing e-mail data, which is contained in the e-mail from the mail source, into such a form receivable by the destination based on said system environment information of the last-named destination which information is stored in said system environment storage section; and a mail sending section sending the processed e-mail to the destination, wherein said mail processing section compresses said e-mail data into such a size receivable by the destination.

11. A mail system for sending an e-mail from a mail source to one or more destinations at their respective mail addresses, comprising:

a system environment storage section storing system environment information of the destinations;

a system environment information table create section creating a system environment information table, which regards the mail addresses of destinations and said system environment information in correlation with each other, by obtaining said system environment information;

a mail processing section processing e-mail data, which is contained in the e-mail from the mail source, into such a form receivable by the destination based on said system environment information of the last-named destination which information is stored in said system environment storage section; and a mail sending section sending the processed e-mail to the destination, wherein said mail processing section divides said e-mail data into a plurality of pieces of e-mail data, each piece of e-mail data having such a size receivable by the destination.

12. A mail system for sending an e-mail from a mail source to one or more destinations at their respective mail addresses, comprising:

a system environment storage section storing system environment information of the destinations;

a system environment information table create section creating a system environment information table, which registers the mail addresses of destinations and said system environment information in correlation with each other, by obtaining said system environment information;

a mail processing section processing e-mail data, which is contained in the e-mail from the mail source, into such a form receivable by the destination based on said system environment information of the last-named destination which information is stored in said system environment storage section; and a mail sending section sending the processed e-mail to the destination, wherein said mail processing section ciphers said e-mail data into such a form decipherable by the destination.

13. A mail system for sending an e-mail from a mail source to one or more destinations at their respective mail addresses, comprising:

a system environment storage section storing system environment information of the destinations;

a system environment information table create section creating a system environment information table, which registers the mail addresses of destinations and said system environment information in correlation with each other, by obtaining said system environment information;

a mail processing section processing e-mail data, which is contained in the e-mail from the mail source, into such a form receivable by the destination based on said system environment information of the last-named destination which information is stored in said system environment storage section; and a mail sending section sending the processed e-mail to the destination, wherein if said e-mail data sent from the mail source is a compressed form, said mail processing section expands such compressed data to the original data size.

14. A mail system for sending an e-mail from a mail source to one or more destinations at their respective mail addresses, comprising:

a system environment storage section storing system environment information of the destinations;

a system environment information table create section creating a system environment information table, which registers the mail addresses of destinations and said system environment information in correlation with each other, by obtaining said system environment information;

a mail processing section processing e-mail data, which is contained in the e-mail from the mail source, into such a form receivable by the destination based on said system environment information of the last-named destination which information is stored in said system environment storage section; and a mail sending section sending the processed e-mail to the destination, wherein if said e-mail data sent from the mail source is in the form of separate pieces of data, said mail processing section combines the separate pieces of data one with another.

15. A mail system for sending an e-mail from a mail source to one or more destinations at their respective mail addresses, comprising:

a system environment storage section storing system environment information of the destinations;

a system environment information table create section creating a system environment information table, which registers the mail addresses of destinations and said system environment information in correlation with each other, by obtaining said system environment information a mail processing section processing e-mail data, which is contained in the e-mail from the mail source, into such a form receivable by the destination based on said system environment information of the last-named destination which information is stored in said system environment storage section; and a mail sending section sending the processed e-mail to the destination, wherein if said e-mail data sent from the mail source is a ciphered form, said mail processing section deciphers said ciphered data.

16. A mail system comprising a source mail server managing a mail address of a mail source sending an e-mail and a destination mail server managing another mail address as a destination mail address of one or more destinations which receive the e-mail from said mail source through said source mail server and said destination mail server, said mail system further comprising:

an address list for mailing list system in which a plurality of destination mail addresses the particular e-mail is sent in one lump are registered;

a mail address rewriting section, operative upon receipt of a notice that the destination mail address of at least one destination has been updated, rewriting the old destination mail address, which is registered in said address list for mailing list system, into a new destination mail address; and a mail storing section temporarily storing a particular e-mail, which is addressed to said old destination mail address, until said new destination mail address is rewritten by said mail address rewriting section, said address list, said mail address rewriting section and said mail storing section all of which are interconnected between said source mail server and said destination mail server.

17. A mail system according to claim 16, further comprising a registration time information recording section recording registration time information, which specifies a time when a particular destination mail address is registered, and the last-named destination mail address in correlation with each other, said mail address rewriting section being operative, upon receipt of the notice that the destination mail address list for mailing list system has been updated, to consult with said registration time information of said new destination mail address and rewrites said old destination mail address into said new destination mail address in accordance with said registration time information.

18. A mail system according to claim 16, further comprising a mail address rewrite instructing section instructing an e-mail address rewrite process, said mail address rewriting section being responsive to the instruction of said mail address rewrite instructing section to perform an e-mail address rewrite process.

19. An apparatus, which is interconnected between a source mail server and a destination mail server, said source mail server managing a mail address of a mail source sending an e-mail, said destination mail server managing another mail address as a destination mail address of one or more destinations which receive the e-mail from said mail source through said source mail server and said destination mail server, said apparatus managing the e-mail comprising:

a mail address manager managing respective destination mail addresses, said mail address manager being operative, in response to updating of the destination mail address of at least one destination, to register a new destination mail address in correlation with the old destination mail address;

a mail storing section temporarily storing a particular e-mail, which is addressed to said old destination mail address, until said new destination mail address is registered by said mail address manager; and a mail sending section, responsive to receipt of an e-mail addressed to said old destination mail address, sending the last-named e-mail to said new mail address.

20. An apparatus for sending an e-mail, which is received from a mail source, to one or more destinations at their respective mail addresses, comprising:

a system environment storage section storing system environment information of the destinations;

a system environment information table create section creating a system environment information table, which registers the mail addresses of destinations and said system environment information in correlation with each other, by obtaining said system environment information; and a mail processing section processing e-mail data, which is contained in the e-mail from the mail source, into such a form receivable by the destination based on said system environment information of the last-named destination which information is stored in said system environment storage section.

21. A method of sending an e-mail from a mail source to one or more destinations at their respective mail addresses through a source mail server, which manages a mail address of the mail source, and a destination mail server, which manages another mail address as a destination mail address of the destinations, comprising:

registering, by a mail address manager interconnected between said source mail server and said destination mail server, when the destination mail address of the particular destination has been updated, the old destination mail address of the particular destination and a new destination mail address in correlation with each other;

temporarily storing a particular e-mail, by a mail storing section interconnected between said source mail server and said destination mail server, which is addressed to said old destination mail address, until said new destination mail address is registered by said mail address manager; and sending an e-mail, by a mail sending section interconnected between said source mail server and said destination mail server, which is addressed to said old destination mail address, to said new destination mail address if the last-named e-mail is addressed to said old destination mail address.

22. A method of sending e-mail from a mail source to one or more destinations at their respective mail addresses, comprising:
retaining system environment information of the destinations;
creating a system environment information table, which is registering the mail addresses of destinations and said system environment information in correlation with each other, by obtaining said system environment information;
processing e-mail data, which is contained in an e-mail sent out from the mail source, into such a form receivable by the individual destination based on said system environment information; and
sending the e-mail having the processed e-mail data to the individual destination.

23. A computer-readable recording medium in which a mail system program is recorded, said mail system program being adapted to render a computer, which is interconnected between a source mail server managing a mail address of a mail source sending an e-mail and a destination mail server managing another mail address as a destination mail address of one or more destinations receiving the e-mail from said mail source through said source mail server and said destination mail server, to function as the following:
a mail address manager managing the destination mail addresses and registering, when the destination mail address of a particular destination has been updated, the old destination mail address of the particular destination and a new destination mail address in correlation with each other;
a mail storing section temporarily storing a particular e-mail, which is addressed to said old destination mail address, until said new destination mail address is registered by said mail address manager; and
a mail sending section for sending an e-mail, which is addressed to said old destination mail address, to said particular destination at said new destination mail address.

24. A computer-readable recording medium according to claim 9, wherein said mail system program renders the computer to function further as the following:
a registration time information recording section which records registration time information, which specifies a time when a mail address of a destination has been entered in a mail address list for mailing list system, and the last-named mail address in correlation with each other; and
a mail address rewriting section which consults with said registration time information upon receipt of a notice that the mail address of said particular destination has been updated, and rewriting the last-named mail address in said mail address list for mailing list system in accordance with said registration time information.

25. A computer-readable recording medium according to claim 9, wherein said mail system program renders the computer to function further as the following:
a mail address rewriting section which rewrites the mail address of said particular destination in said mail address; and
a mail address rewrite instructing section which gives an instruction to said mail address rewriting section to rewrite said mail address list for mailing list system in accordance with said instruction of said mail rewrite instructing section.

* * * * *

UNITED STATES PATENT AND TRADEMARK OFFICE
CERTIFICATE OF CORRECTION

PATENT NO. : 7,252,198 B2 Page 1 of 1
APPLICATION NO. : 09/818547
DATED : August 7, 2007
INVENTOR(S) : Yoshifusa Togawa et al.

It is certified that error appears in the above-identified patent and that said Letters Patent is hereby corrected as shown below:

Col. 29, line 15, delete "information" and insert --information;--

Col. 30, line 52, after "address of" delete "the" and insert --a--, therefor.

Signed and Sealed this

Fourth Day of March, 2008

JON W. DUDAS
*Director of the United States Patent and Trademark Office*